(12) United States Patent
Kawashima et al.

(10) Patent No.: US 6,592,228 B1
(45) Date of Patent: Jul. 15, 2003

(54) PROJECTOR COMPRISING A MICROCOMPUTER FOR CONTROLLING ZOOM AND FOCUS ADJUSTMENTS UTILIZING PATTERN GENERATION AND CALCULATION MEANS

(75) Inventors: Masahiro Kawashima, Ibaraki (JP); Takaaki Gyoten, Kobe (JP)

(73) Assignee: Matsushita Electric Industrial Co., LTD, Osaka-Fu (JP)

( * ) Notice: Subject to any disclaimer, the term of this patent is extended or adjusted under 35 U.S.C. 154(b) by 0 days.

(21) Appl. No.: 09/831,467

(22) PCT Filed: Dec. 24, 1999

(86) PCT No.: PCT/JP99/07255

§ 371 (c)(1),
(2), (4) Date: May 9, 2001

(87) PCT Pub. No.: WO01/48551

PCT Pub. Date: Jul. 5, 2001

(51) Int. Cl.⁷ .......................... G03B 3/00; G03B 21/00; H04N 3/26
(52) U.S. Cl. .......................... 353/101; 353/69; 353/70; 352/140; 348/745
(58) Field of Search .................. 353/101, 100, 353/69, 70, 79, 30, 31, 34, 37; 349/5, 6, 7, 8; 352/140; 348/745, 806

(56) References Cited

U.S. PATENT DOCUMENTS

| 4,942,425 | A | | 7/1990 | Kamimura et al. ............ 355/45 |
|---|---|---|---|---|
| 5,036,352 | A | | 7/1991 | Kamimura et al. ............ 355/45 |
| 5,153,638 | A | | 10/1992 | Sakaibara ..................... 355/55 |
| 5,455,647 | A | * | 10/1995 | Fujiwara ...................... 353/101 |
| 5,537,170 | A | | 7/1996 | Lee et al. ..................... 353/101 |
| 6,364,491 | B1 | * | 4/2002 | Okada et al. ................. 353/101 |
| 6,367,933 | B1 | * | 4/2002 | Chen et al. ..................... 353/69 |
| 6,416,186 | B1 | * | 7/2002 | Nakamura ..................... 353/69 |
| 2002/0021418 | A1 | * | 2/2002 | Raskar ........................ 353/69 |

FOREIGN PATENT DOCUMENTS

WO  WO 94/08271  4/1994  ........... G03B/27/34

* cited by examiner

*Primary Examiner*—Russell Adams
*Assistant Examiner*—Melissa J. Koval

(57) ABSTRACT

A projector that can be easily set up and adjusted is disclosed. In accordance with a projection condition inputted into a microcomputer via a remote-controller, the microcomputer selects an optimum projection lens by referring to correlation data showing a relation among a projection lens, a projection display size, and an optimum projection distance. The microcomputer has a screen to indicate an optimum projection lens and projection distance that satisfy the inputted projection condition. The microcomputer calculates the amounts of zoom and focus adjustments to be made to the projection lens with reference to the correlation data so as to attain the projection display size and the microcomputer automatically drives the projection lens via a zoom driving unit and a focus driving unit.

25 Claims, 22 Drawing Sheets

Fig. 10

PROJECTION LENS CORRELATION DATA MAP

| display size (diagonal) | fixed-focus lens | | | projection distance | | zoom lens | | | |
|---|---|---|---|---|---|---|---|---|---|
| | TYPE-1 (1.2:1) | TYPE-2 (3.3:1) | TYPE-3 (5:1) | TYPE-4 (7:1) | | TYPE-5 (1.5~3:1) | | TYPE-6 (3~5.3:1) | |
| | | | | | | min. | max. | min. | max. |
| 50 | 1480 | 3815 | 5896 | 8530 | | 1637 | 3176 | 2096 | 5431 |
| 70 | 2012 | 5155 | 7908 | 11312 | | 2242 | 4388 | 3366 | 7603 |
| 100 | 2811 | 7175 | 10941 | 15504 | | 3151 | 6206 | 5272 | 10861 |
| 120 | 3347 | 8525 | 12968 | 18305 | | 3756 | 7419 | 6542 | 13033 |
| 150 | 4149 | 10551 | 16010 | 22510 | | 4665 | 9237 | 8448 | 16292 |
| 180 | 4952 | 12578 | 19054 | 26718 | | 5573 | 11056 | 10354 | 19550 |
| 200 | 5487 | 13930 | 21084 | 29524 | | 6178 | 12268 | 11624 | 21722 |
| 250 | 6827 | 17311 | 26161 | 36541 | | 7692 | 15299 | 14800 | 27153 |
| 300 | 8166 | 20693 | 31238 | 43559 | | 9206 | 18329 | 17976 | 32583 |
| 350 | 9505 | 24075 | 36317 | 50579 | | 10720 | 21360 | 21152 | 38014 |
| 400 | 10845 | 27458 | 41396 | 57598 | | 12234 | 24391 | 24328 | 43444 |
| 450 | 12185 | 30841 | 46475 | 64619 | | 13748 | 27422 | 27504 | 48875 |
| 500 | 13525 | 34223 | 51554 | 71639 | | 15261 | 30452 | 30680 | 54305 |

Fig. 13

PROJECTION LENS ADJUSTMENT TABLE

| projection lens | TYPE-6 | |
|---|---|---|
| projection display size (inch) | 450 | |
| projection distance (mm) | zoom adjustment (pulse) | focus adjustment (pulses) |
| 27504 | $p_1$ | $q_1$ |
| 27604 | $p_2$ | $q_2$ |
| 27704 | $p_3$ | $q_3$ |
| ⋮ | ⋮ | ⋮ |
| 30004 | $p_m$ | $q_m$ |
| 30104 | $p_{m+1}$ | $q_{m+1}$ |
| ⋮ | ⋮ | ⋮ |
| 48704 | $p_{n-2}$ | $q_{n-2}$ |
| 48804 | $p_{n-1}$ | $q_{n-1}$ |
| 48875 | $p_n$ | $q_n$ |

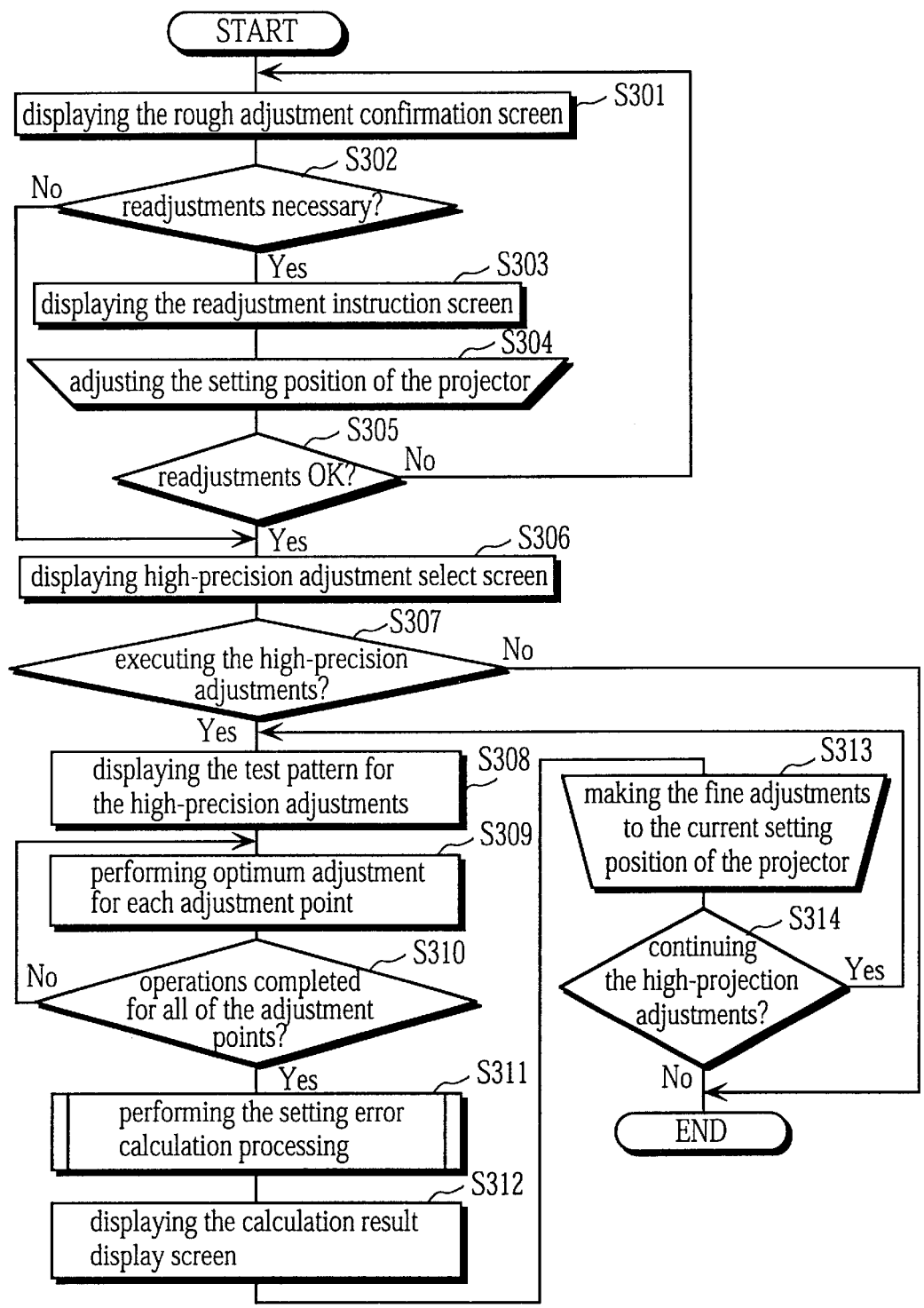

Fig. 15A

```
                                              ⌒45
┌──────────────────────────────────────────────────┐
│ projection state OK?    Yes   No                 │
│ current display size    Large、 Small            │
│ position in inappropriate state  Left、 Right    │
│                                  Upper、 Lower   │
└──────────────────────────────────────────────────┘
```

Fig. 15B

```
                                              ⌒46
┌──────────────────────────────────────────────────┐
│                                                  │
│   Readjust the setting position                  │
│   of projector.                                  │
│   Readjustment OK?   Yes   No                    │
│                                                  │
└──────────────────────────────────────────────────┘
```

Fig. 15C

```
                                              ⌒47
┌──────────────────────────────────────────────────┐
│   Execute the high-precision adjustments?        │
│                Yes   No                          │
└──────────────────────────────────────────────────┘
```

Fig. 19A

```
                                                         50
┌─────────────────────────────────────────────────────────┐
│ adjustment point(1−9)?   No.□                           │
│     focus adjustment      <      >                      │
│     zoom adjustment       <      >                      │
│     position adjustment         <  >   ∧   ∨            │
│ Store data?                  Yes   No                   │
└─────────────────────────────────────────────────────────┘
```

Fig. 19B

```
                                                         51
┌─────────────────────────────────────────────────────────┐
│ Setting Errors                                          │
│     projection distance     **.* cm                     │
│     horizontal inclination  **.* degree                 │
│     vertical inclination    **.* degree                 │
│     horizontal position     **.* cm                     │
│     vertical position       **.* cm                     │
│                                                         │
│ Make the fine adjustments to                            │
│ the position of projector again                         │
│                                                         │
│ Continue the high-precision                             │
│ adjustments?   Yes   No                                 │
└─────────────────────────────────────────────────────────┘
```

Fig. 20

ADJUSTMENT STORING TABLE

| adjustment point | zoom adjustment (pulse) | focus adjustment (pulse) | vertical axis displacement (pulse) | horizontal axis displacement (pulse) |
|---|---|---|---|---|
| 1 | $\Delta pz1$ | $\Delta pf1$ | $\Delta pv1$ | $\Delta ph1$ |
| 2 | $\Delta pz2$ | $\Delta pf2$ | $\Delta pv2$ | $\Delta ph2$ |
| 3 | $\Delta pz3$ | $\Delta pf3$ | $\Delta pv3$ | $\Delta ph3$ |
| 4 | $\Delta pz4$ | $\Delta pf4$ | $\Delta pv4$ | $\Delta ph4$ |
| 5 | $\Delta pz5$ | $\Delta pf5$ | $\Delta pv5$ | $\Delta ph5$ |
| 6 | $\Delta pz6$ | $\Delta pf6$ | $\Delta pv6$ | $\Delta ph6$ |
| 7 | $\Delta pz7$ | $\Delta pf7$ | $\Delta pv7$ | $\Delta ph7$ |
| 8 | $\Delta pz8$ | $\Delta pf8$ | $\Delta pv8$ | $\Delta ph8$ |
| 9 | $\Delta pz9$ | $\Delta pf9$ | $\Delta pv9$ | $\Delta ph9$ | ns
PROJECTOR COMPRISING A MICROCOMPUTER FOR CONTROLLING ZOOM AND FOCUS ADJUSTMENTS UTILIZING PATTERN GENERATION AND CALCULATION MEANS

TECHNICAL FIELD

The present invention relates to a projector that projects an image formed on an image display device, such as a liquid crystal panel, via a projection lens, and particularly relates to a technique of simplifying adjustments made to projection conditions of the projector.

BACKGROUND ART

In recent years, so-called "light-valve type" projectors have come into widespread use. A light-valve type projector forms an image on a light valve, such as a liquid crystal panel, and projects the image onto a screen via a projection lens.

When such a conventional projector is set in a space, such as a hall, the procedure shown as the flowchart in FIG. 1 has been employed.

As shown in FIG. 1, the setting procedure for a projector 200 (see FIG. 2) is roughly divided into two stages. One stage is for the preliminary setting of the projector 200 (steps S501 to S504), and this stage is referred to as the "simulation". The other stage is for the actual setting of the projector 200 at the site (steps S505 to S510), and setup and adjustments of the projector 200 are performed in this stage.

In the simulation, a size of an image to be projected by the projector 200 (this size is referred to as the "projection display size" hereinafter) is first set (step S501). Then, a distance between a projection lens 210 of the projector 200 and a screen 300 (this distance is referred to as the "projection distance" hereinafter) and a vertical positional relation between the projector 200 and the screen 300 are roughly set (step S502).

FIG. 2 and FIG. 3 are respectively a side view and a top plan view showing the positional relation between the projector 200 and the screen 300. In FIG. 2, a distance L1 indicates the projection distance measured between the screen 300 and the projection lens 210 of the projector 200. A distance L2 indicates the vertical relative distance between the screen 300 and the projector 200. The distance L2 is calculated by subtracting a distance between the vertical center of the projection lens 210 and the floor from a distance between the vertical center of the screen 300 and the floor.

As to the projection distance L1 and the vertical relative distance L2, a user refers to specifications of a plurality of projection lenses prepared for the projector 200 and roughly sets these distances with consideration given to various conditions, such as space, of the setting site.

Based on the results of the above rough settings, an appropriate lens is selected from the plurality of projection lenses prepared for the projector 200 (step S503). Selecting the optimum lens largely depends on the zoom ratio of the projection lens 210 and the availability of the zoom function.

When the projection lens having the zoom function is selected as the projection lens 210, the zoom ratio is set and an amount of vertical axis displacement adjustment is roughly calculated.

Here, the amount of vertical axis displacement adjustment refers to an amount by which the position of the light valve is adjusted relative to the optical axis of the projection lens 210 in the vertical direction. This adjustment is made so that a projection position of an image coincides with the correct position of the screen 300 in the vertical direction. The amount of vertical axis displacement is easily obtained from the zoom ratio and the vertical relative distance L2 between the screen 300 and the projector 200 that was calculated in step S502.

When this amount of vertical axis displacement exceeds the maximum amount described in the specifications of the projector 200, a support table 250 is set under the projector 200 to make up an insufficient height (step S504). Accordingly, the rough simulation based on the specifications of the projector 200 is completed.

Next, the setup and adjustments of the projector 200 performed in accordance with the stated rough simulation is explained.

First, based on the results of the simulation, the position of the projector 200 to be set at the site is determined (step S505). Here, the setting position of the projector 200 should be determined with a high degree of precision in accordance with the projection distance obtained in the simulation. Also, the setting direction of the projector 200 and the positional relation between the projector 200 and the screen 300 should be adjusted at a high degree of precision. To be more specific regarding the positional relation, the setting direction of the projector 200 should be adjusted so as to be parallel to the direction of the normal to the screen 300 in the horizontal direction, while it should be adjusted in the vertical direction so as to correspond to a predetermined setting angle as specified for the projector 200.

After the projector 200 has been accordingly positioned, the projector 200 is turned on and an image actually projected onto the screen 300 is assessed. In general, the projection distance is rechecked by actual measurement in a case where the adjustment performance for the projected images is highly valued (step S506).

When the setting position of the projector 200 is judged to be imperfect from the assessment of the image projected on the screen 300 and actual measurement of the projection distance ("NG" in step S506), the processing returns to step S505 to reset the position of the projector 200. On the other hand, when the setting position of the projector 200 is judged to have no problems from the assessment of the image projected on the screen 300 and actual measurement of the projection distance ("OK" in step S506), the processing advances to step S507. When the projection lens 210 is a zoom-type lens, adjustment to the zoom ratio of the projection lens, the so-called "zoom adjustment", is performed (step S507). Following this, adjustment to the vertical axis displacement of the projection lens 210 is performed (step S508). Then, the focus of the projection lens 210 is adjusted (step S509).

The zoom adjustment, vertical axis displacement adjustment, and focus adjustment are not completely independent of one another. Therefore, the user has to execute these adjustments as necessary while viewing the image projected on the screen 300. More specifically, if the zoom ratio is changed, the amounts of axis displacement and focus adjustments will also vary and so have to be accordingly adjusted. While making fine adjustments, the user reassesses the image projected on the screen 300. If the projection state resulting from the fine adjustments is judged to be inadequate, the zoom ratio, axis displacement, and focus adjustments are repeated so as to converge on an optimum projection state.

After these adjustments have been completed, it is confirmed that the projection display size, geometric distortion, and consistency in the focus performance for the entire display area satisfy a level required for the current use of the projector 200 (step S510). If there are still problems in the projection conditions of the projector 200 in this stage of confirming the adjustment results ("NG" in step S510), the processing returns to step S505 to reset the position of the projector 200. Then, the fine adjustments to the position of the projector 200 and readjustments to the projection lens system are repeated. When the image quality is judged to be adequate to the level required for the current use of the projector 200 ("OK" in step S510), the projector setting including the setup and adjustments is terminated.

For the conventional projector, the adjustments to the projection lens are electrically controlled in order to help simplify the adjustments to the projector. FIG. 4 shows a construction example of a driving system that is provided for such a conventional projector to drive the projection lens.

As shown in FIG. 4, the driving system of the projection lens 210 is composed of a focus driving unit 211, a zoom driving unit 212, a vertical axis displacement adjusting mechanism 213, and a vertical axis displacement driving unit 214. The focus driving unit 211 electrically drives a focus adjusting mechanism of the projection lens 210. The zoom driving unit 212 electrically drives a zoom adjusting mechanism. The vertical axis displacement adjusting mechanism 213 holds the projection lens 210 in such a manner that the projection lens 210 can shift in the vertical direction, and executes the vertical axis displacement adjustment. The vertical axis displacement driving unit 214 electrically drives the vertical axis displacement adjusting mechanism 213.

A control unit that controls the driving system of the projection lens 210 is composed of a remote controller 201, a controller signal photoreceiver 202, a controller signal decoding circuit 203, a microcomputer 205, and a data memory 206.

A control operation of the projector 200 is explained, taking a case where the focus adjustment is performed using the driving system of the projection lens 210 as an example. The user makes key entries using the remote controller 201 while checking the current state of the focus adjustment made to an image projected on the screen 300. Controller signals based on the key operation by the user are transmitted in the form of infrared ray signals or the like from the remote controller 201 to the controller signal photoreceiver 202.

The controller signal photoreceiver 202 converts the signals transmitted in the form of infrared ray signals or the like into analog electric signals. The analog electric signals are decoded into digital signals by the controller signal decoding circuit 203, and are inputted to the microcomputer 205.

The microcomputer 205 outputs a focus control signal based on the inputted controller signal information to the focus driving unit 211.

In accordance with the focus control signal received from the microcomputer 205, the focus driving unit 211 changes the focus state of the image projected on the screen 300 by driving the focus adjusting mechanism of the projection lens 210. The user assesses the change in the focus state of the projected image resulting from the key operation. If the projected image is judged to have no problems, the user sets the current state as the optimum focus state using the remote controller 201. Subsequent to this, adjustment data indicating the optimum focus state is stored in the nonvolatile data memory 206 according to the instruction from the remote controller 201.

When the zoom driving unit 212 and the vertical axis displacement driving unit 214 are driven and controlled to make the adjustments to the zoom and axis displacement, the same signal control and series of operations using the remote controller 201 are performed as is the case with the stated focus adjustment.

However, the adjustments made to the setting position of the projector and to the zoom ratio, focus, and axis displacement of the projection lens have to be performed based on the combination of the visual assessment of the projected image and manual adjustments to the positions of the projector and the projection lens, in accordance with the projection conditions and specifications of the projection lens. On top of that, these -adjustments have to be repeated to converge on the optimum projection state for the projector and the screen. Thus, this conventional method has problems of a time taken for the adjustments, adjustment precision, and a rise in the cost of the adjustment technique. To reduce these problems, the projection conditions have to be set at a high degree of precision (within a precision of a few centimeters) in the simulation stage. This also takes much time.

These circumstances remain the same even though the projection lens system is electrically driven and so the adjustments are simplified as compared with the manual adjustments. In spite of this improvement, the user has to adjust each component independently based on the visual assessment of the projected image. In order to converge on the optimum condition, the user still has to execute the adjustments at much expense in time and effort.

Particularly, there are market requirements in recent years, such as a bigger screen size, higher brightness, higher definition, longer focuses for the projection distance in a particular use, and capability for use in an emergency. These requirements are increasingly rising especially for oversize high-brightness projectors. An oversize high-brightness projector is heavy, meaning that it is not easy to set the projector at a site. When this projector is to be set under a strict setting condition, such as suspending the projector from a ceiling of a large hall, it is considerably hard to repeat the above-mentioned adjustments.

In general, the projection lens of the high-brightness projector can be selected from a plurality of lenses, such as fixed-focus type and zoom type lenses. The projection conditions are different for each lens type, and therefore it further takes time to converge on the optimum projection state.

It is therefore an object of the present invention to provide a projector which can be easily set up and adjusted to an optimum state particularly when the projector is used in a large space, such as a hall.

DISCLOSURE OF INVENTION

The projector of the present invention is made up of: a lens driving unit for driving the projection lens; a receiving unit for receiving an input of at least one projection condition; a parameter determining unit for determining a control parameter to control the lens driving unit, in accordance with the received projection condition; and a control unit for controlling the lens driving unit in accordance with the determined control parameter.

With this construction, the control parameter is automatically determined in accordance with the projection condition received by the receiving unit. Based on the determined control parameter, the lens driving unit is driven. Consequently, the user can quickly set and adjust the projector without the inconvenience of manually adjusting the setting position of the projector.

When the projection lens to be used in the projector is interchangeable, the control parameter can be determined in accordance with the selected projection lens and projection condition that were received as the projection conditions by the receiving unit.

The projector is also made up of: a storing unit for storing information regarding a characteristic for each of a plurality of interchangeable projection lenses; a selecting unit, in accordance with the information stored in the storing unit, for selecting a projection lens from the plurality of projections lenses as an optimum projection lens, the characteristic of the selected projection lens most satisfying the received projection condition; and a displaying unit for indicating the projection lens selected as the optimum projection lens. With this construction, the user will not hesitate over which projection lens to select.

The projector of the present invention is made up of: a receiving unit for receiving an input from a user; a control unit for controlling the lens driving unit in accordance with the input received from the user; a pattern generating unit for displaying a predetermined pattern formed from a plurality of pattern images on the image display device so that the plurality of pattern images are respectively displayed at a plurality of positions on a display area of the image display device; a calculating unit for calculating errors in setting conditions of the projector in accordance with amounts of control to be performed by the control unit for each pattern image through an input operation which the user performed to adjust a projection state of the pattern image projected on the screen; and a displaying unit for indicating the errors calculated by the calculating unit.

By means of this construction, the user can obtain the errors in the setting conditions of the projector simply by adjusting each projection state of the pattern images, thereby easily performing the high-precision adjustments to the setting conditions of the projector.

The projector is also made up of: an entry screen displaying unit for displaying an entry screen on which the user inputs a content that is to be received by the receiving unit; and an entry screen control unit for having the entry screen show the content that is received by the receiving unit from the user. Thus, the user can extremely easily perform the adjustments by referring to the content displayed on the entry screen.

BRIEF DESCRIPTION OF DRAWINGS

FIG. 10 is a table showing projection lens correlation data that is stored in a projection condition preset memory 6.

FIG. 13 is an example of a projection lens adjustment table.

FIG. 14 is a flowchart showing the procedure for high-precision adjustments in a second embodiment of the present invention, the procedure being executed after a projector has been set up.

FIG. 15A is a rough adjustment confirmation screen displayed as an entry screen in the second embodiment.

FIG. 15B is a readjustment instruction screen displayed as an entry screen in the second embodiment.

FIG. 15C is a high-precision adjustment select screen displayed as an entry screen in the second embodiment.

FIG. 19A is an adjustment entry screen that is used when the user inputs the amounts of adjustment for each pattern image while viewing the image projected on the screen.

FIG. 19B is a calculation result display screen showing the calculation results of errors in the setting position of the projector, the calculation being performed based on the contents entered on the adjustment entry screen.

FIG. 20 is an example of an adjustment storing table in which data regarding the amounts of adjustments are stored for each point.

BEST MODE FOR CARRYING OUT THE INVENTION

The following is a description of embodiments of the present invention, with reference to the drawings.

First Embodiment (1) Construction of Projector 100

Figure 5:
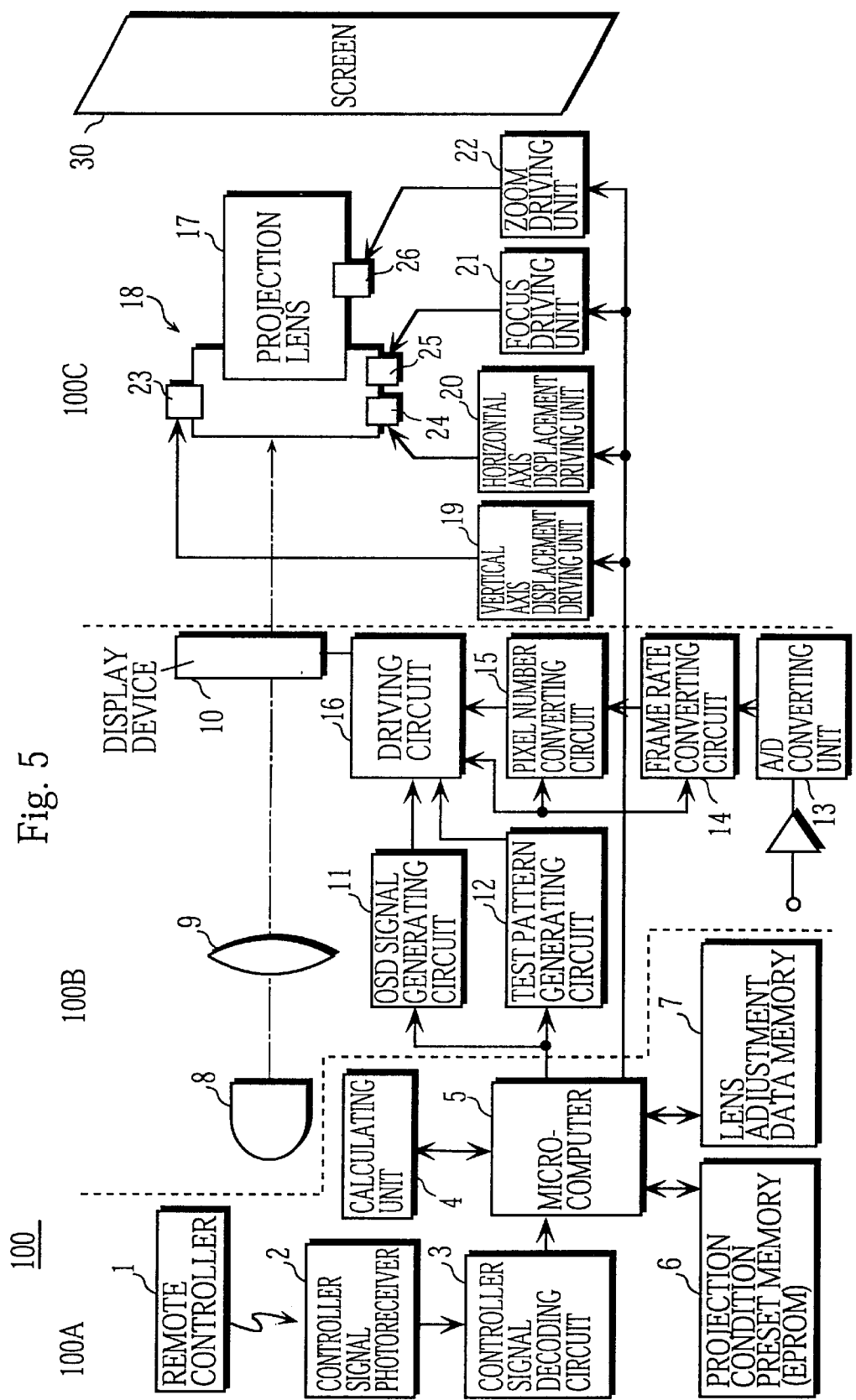
FIG. 5 is a block diagram showing the construction of a projector of a first embodiment of the present invention.

FIG. 5 is a block diagram showing the construction of a projector 100 of a first embodiment of the present invention.

The projector 100 is mainly composed of a control system 100A, an image display system 100B, and a projection lens system 100C.

The control system 100A includes a remote controller 1 used for a remote operation, a controller signal photoreceiver 2, a controller signal decoding circuit 3, a calculating unit 4, a microcomputer 5, a projection condition preset memory 6, and a lens adjustment data memory 7.

The projector 100 is constructed so that a projection lens is interchangeable. The projection condition preset memory 6 stores data for each projection lens. The data for each projection lens includes the zoom ratio and a projection distance required to project an image with a desired projection display size, and is stored in a map format. This data is referred to as the "projection lens correlation data" hereinafter.

The lens adjustment data memory 7 stores adjustment data that was obtained after the projection lens system 100C has been adjusted.

When the user sends an instruction to the projector 100 using the remote controller 1, a signal representing the instruction is transmitted from the remote controller 1 to the controller signal photoreceiver 2. The signal is then decoded by the controller signal decoding circuit 3, and is transmitted to the microcomputer 5. In accordance with the received signal representing the instruction from the user, the microcomputer 5 refers to the contents stored in the projection condition preset memory 6 and the lens adjustment data memory 7, and has the calculating unit 4 perform necessary calculations according to programs stored in an internal memory. Simultaneously, the microcomputer 5 controls the image display system 100B and each driving unit of the projection lens system 100C. These controls performed by the microcomputer 5 will be described in detail later.

The image display system 100B includes a light source 8, a condensing lens 9, a display device 10, a driving circuit 16 for performing signal composition and driving the display device 10, an OSD (On-Screen Display) signal generating circuit 11, a test pattern generating circuit 12, an A/D converting unit 13, a frame rate converting circuit 14, and a pixel number converting circuit 15. The OSD signal generating circuit 11 generates a test pattern or entry screen used in the adjustment, and has it overlaid on another image on a screen 30 (this coincidental display is referred to as the "on-screen display"). The A/D converting unit 13 reproduces video signals inputted from an outside terminal.

As the display device 10 which is a light valve, a transmission-type color liquid crystal panel is used in the present embodiment. The well-known circuit construction is employed to drive the display device 10 based on the video signals inputted from the outside terminal. FIG. 5 shows an example of the circuit construction.

The A/D converting unit 13 receives the video signals from the external terminal, such as a videocassette recorder. The A/D converting unit 13 then converts the received video signals into digital signals and transmits the digital signals to the frame rate converting circuit 14. The frame rate converting circuit 14 converts vertical and horizontal synchronizing frequencies so as to have them in agreement with the number of pixels displayed by the display device 10. Then, the frame rate converting circuit 14 transmits the video signals to the pixel number converting circuit 15. The pixel number converting circuit 15 interpolates data between the pixels of the video signals or performs data thinning-out in a manner which is consistent with the number of pixels displayed by the display-device 10, and then transmits the video signals to the driving circuit 16. The driving circuit 16 drives the display device 10 based on the video signals so as to have the display device 10 display an image.

Meanwhile, a light beam emitted by the light source 8 is condensed by the condensing lens 9 and incident upon a display screen of the display device 10. The image passing through the display screen of the display device 10 is projected onto the screen 30 via a projection lens 17 in the projection lens system 100C.

The projection lens system 100C includes a projection lens 17, a lens holding unit 18, a vertical axis displacement driving unit 19, a horizontal axis displacement driving unit 20, a focus driving unit 21, and a zoom driving unit 22. The lens holding unit 18 holds the projection lens 17 in such a manner that the projection lens 17 can shift in the vertical, horizontal, and optical axis directions. The vertical axis displacement driving unit 19 drives: a driving motor 23 used for the vertical axis displacement adjustment (this motor is referred to as the "vertical axis driving motor 23" hereinafter); a driving motor 24 used for the horizontal axis displacement adjustment (this motor is referred to as the "horizontal axis driving motor 24" hereinafter); a focus driving motor 25; and a zoom driving motor 26. These driving motors 23, 24, 25, and 26 are provided for the lens holding unit 18.

Figure 6:
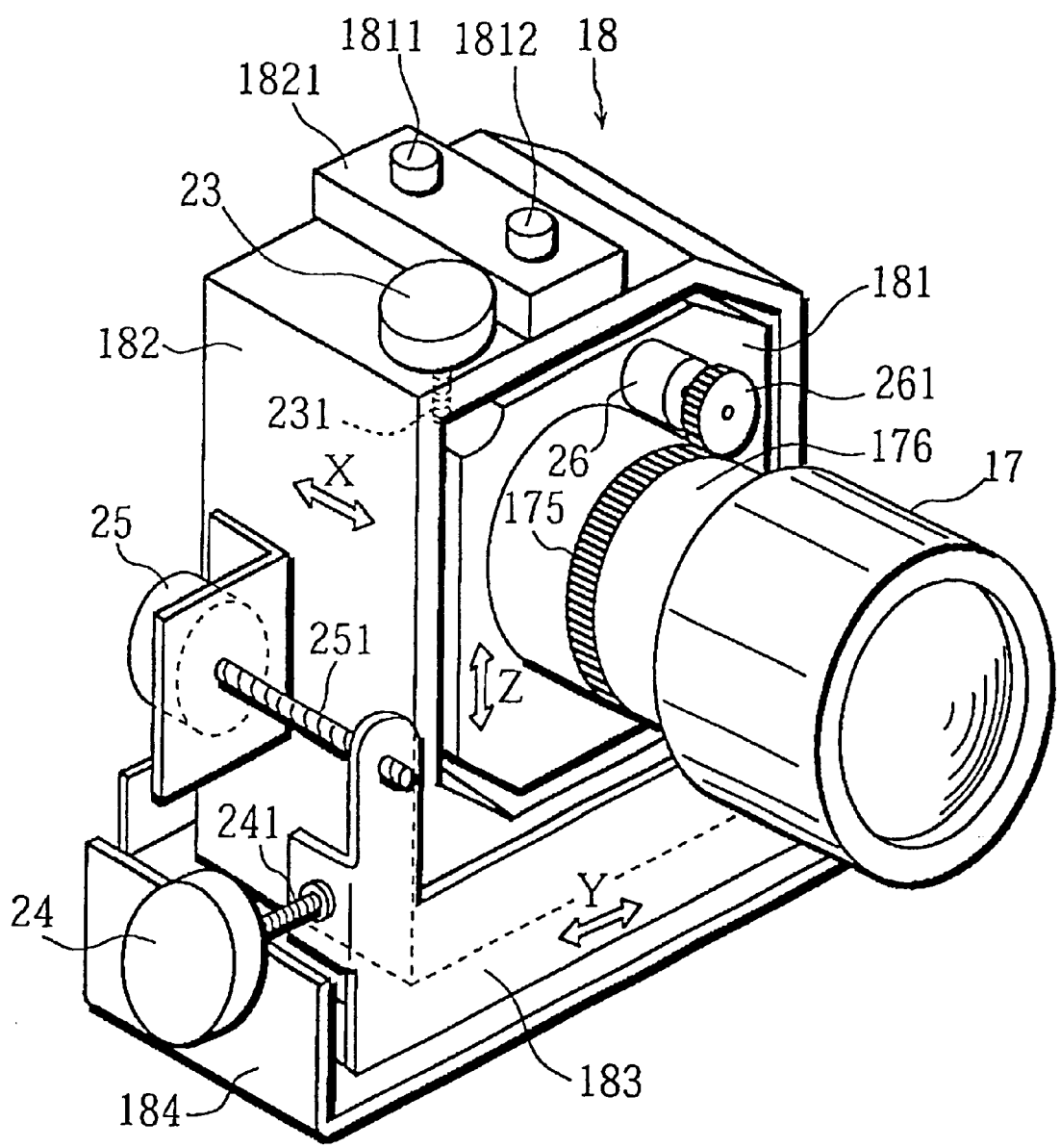
FIG. 6 is a perspective view showing the construction of a driving mechanism of a projection lens of the projector.

FIG. 6 is a perspective view showing the construction of a driving mechanism of the lens holding unit 18. The lens holding unit 18 is composed of a lens holding block 181, a block holding frame 182, a shifting base 183, and a fixed base 184. The projection lens 17 is mounted on the lens holding block 181. Note here that the projection lens 17 can be replaced with a different type of lens. The block holding frame 182 holds the lens holding block 181 in such a manner that the lens holding block 181 can shift in the vertical direction indicated by an arrow Z. The shifting base 183 holds the block holding frame 182 so that the block holding frame 182 can shift in the optical axis direction indicated by an arrow X. The fixed base 184 holds the shifting base 183 in such a manner that the shifting base 183 can shift in the horizontal direction indicated by an arrow Y, the direction Y being perpendicular to the direction X.

Two rods 1811 and 1812 stands on the upper surface of the lens holding block 181. These rods 1811 and 1812 pass through a rod holding member 1821 that is set on the block holding frame 182, the rods being slidable. Although not illustrated in FIG. 6, the underside of the lens holding block 181 has the same construction as its upperside. With this construction, the lens holding block 181 is held so as to be slidable together with the projection lens 17 in the direction Z. The block holding frame 182 is held on the shifting base 183, being slidable in the direction X on a rail that is not shown. The shifting base 183 is in turn held so as to be slidable in the direction Y on a rail that is not shown.

The vertical axis driving motor 23, the horizontal axis driving motor 24, and the focus driving motor 25 are respectively used to shift the corresponding driving-target components in the directions Z, X, and Y. Bolts 231, 241, and 251 are directly coupled to shafts of the driving motors 23, 24, and 25 respectively. Each of the bolts 231, 241, and 251 is screwed into a screw hole provided on the corresponding driving-target component. According to the well-known screw feeding action, the lens block holding block 181, the block holding frame 182, and the shifting base 183 can be shifted in the respective axis directions of the bolts 231, 241, and 251.

The zoom driving motor 26 is held on the lens holding block 181 via a holding member that is not shown. A pinion 261 is mounted on a driving shaft of the zoom driving motor 26 and meshes with a zoom driving gear wheel 175 that is provided on an outer surface of the projection lens 17. With this construction, a movable cylinder 176 is rotated when the zoom driving is performed.

Although not illustrated in FIG. 6, standard position sensors are provided to respectively detect whether the lens holding block 181, the block holding frame 182, and the shifting base 183 are in their standard positions (or, home positions). The amounts by which these components 181, 182, and 183 are to be shifted are controlled based on the amounts of rotation of the corresponding driving motors 23, 24, and 25, since the standard position sensors detect the standard positions of the components 181, 182, and 183.

In the present embodiment, stepping motors are used as the driving motors 23, 24, and 25. As such, each amount of rotation of the driving motors 23, 24, and 25 is controlled based on the number of driving pulses. However, a motor having a reduction gear and an internal encoder may be used. In this case, feedback control may be performed in accordance with the number of pulses detected by the internal encoder.

The zoom driving for the projection lens 17 is similarly controlled as follows. A mark, for example, is put on an outer surface of the movable cylinder 176 of the projection lens 17. The movable cylinder 176 is judged to be in the standard position when the mark is detected by a photoelectric sensor (not shown) that is set in a predetermined position. In accordance with the amount by which the zoom driving motor 26 has been rotated with respect to the standard position, the zoom driving for the projection lens 17 is controlled.

As described later, the adjustments to the projector 100 can be made by the user in an interactive manner. Specifically, a message or selection menu corresponding to a current state of the adjustment is displayed on the screen 30 by the projector 100 in the on-screen display state. When the menu screen is displayed on the screen 30 in the on-screen display state, the user selects an item and confirms an entry on the menu screen using the remote controller 1.

Figure 7:
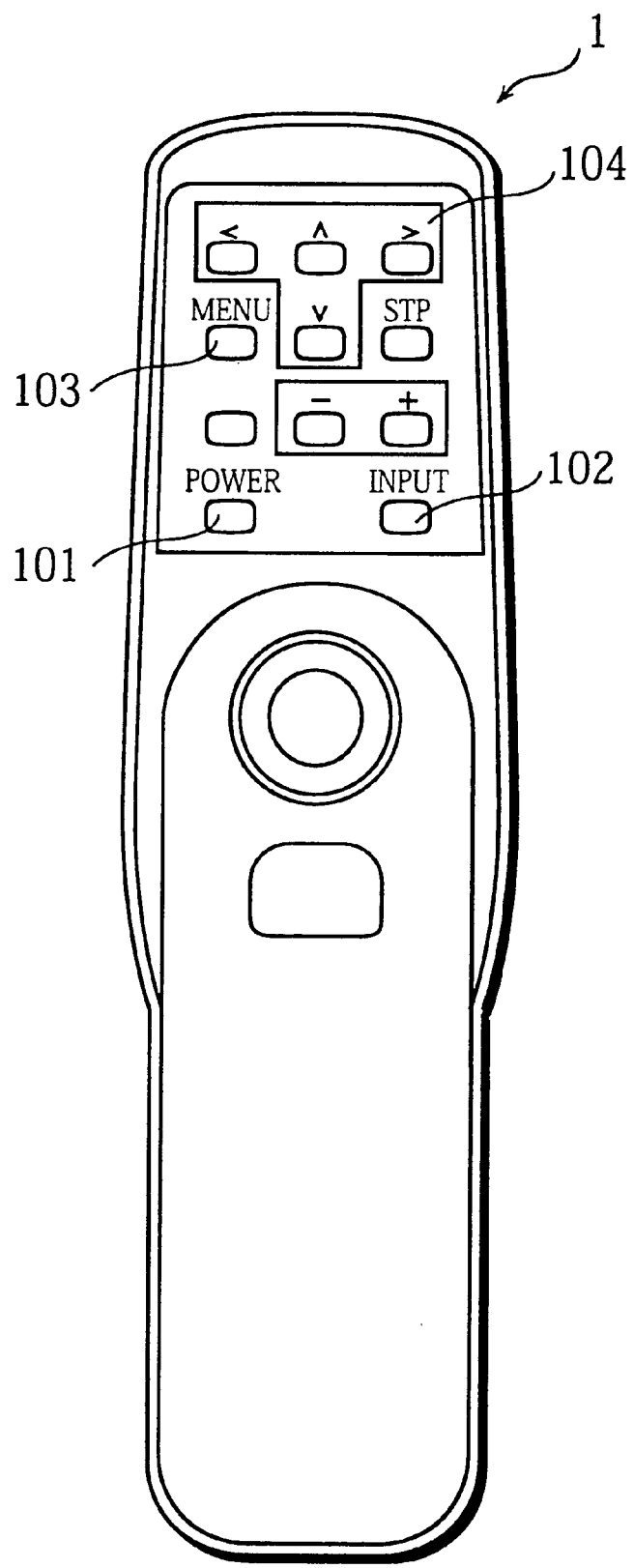
FIG. 7 shows an arrangement example of operation buttons on a remote controller of the projector.

FIG. 7 shows an arrangement example of operation buttons provided on the remote controller 1. As shown in FIG. 7, the operation buttons of the remote controller 1 include a power button 101 for turning on the projector 100, an input button 102 for confirming the inputted content, a menu button 103 for displaying the menu screen, and arrow buttons 104. The arrow buttons 104 are used for moving a cursor on the menu screen and for increasing or decreasing a numeric value on the entry screen.

(2) Procedure for Setting Up and Adjusting Projector 100

Figure 8:
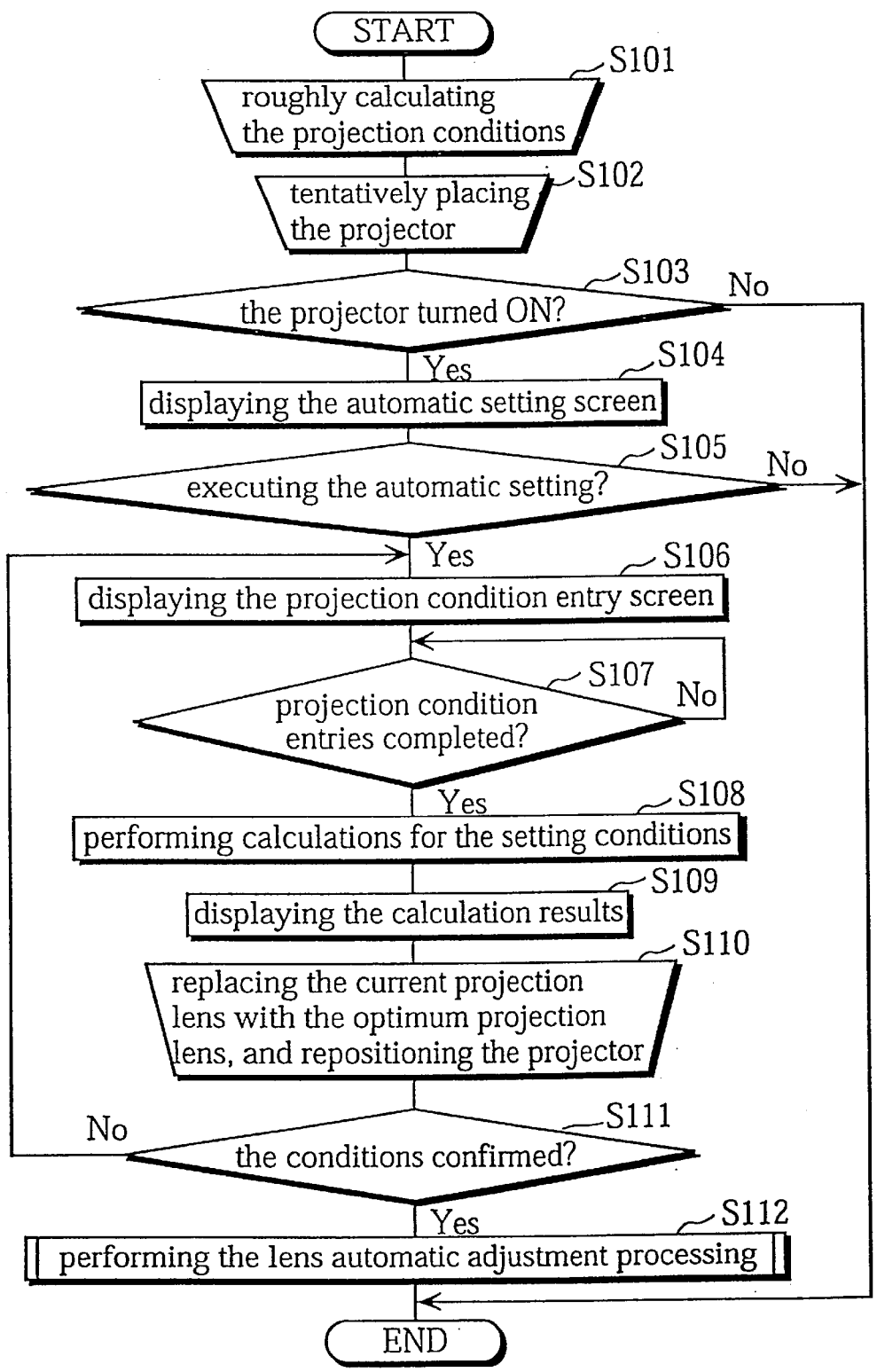
FIG. 8 is a flowchart showing the procedure of setting up and adjusting the projector in the first embodiment.

The procedure for setting up the projector 100 having the stated construction in a space, such as a hall, and adjusting the projection lens system 100C is explained, with reference to the flowchart shown in FIG. 8.

Before actually setting up the projector 100, the user roughly calculates the projection distance between the screen 30 and the projector 100 with consideration given to the projection display size, and also roughly obtains the vertical positional relation between the screen 30 and the projector 100 (step S101). In doing so, the user may look at a sketch illustrating the inside of the hall. The values representing the projection distance and vertical positional relation are used for a tentative setup of the projector 100 at the site and so do not have to be accurate. Using the conventional technique, however, each projection condition has to be accurate to within a few centimeters and a projection lens has to be specified in the stage of the simulation so that the adjustments to be made at the site would be simplified. These accuracies are not required in the present embodiment since the projector 100 of the present invention is so constructed as to achieve considerably easy adjustments as described later.

In accordance with the calculation results obtained in the simulation, the projector 100 is tentatively set up at the site (step S102). At the moment, a regular projection lens is used as the projection lens 17 of the projector 100.

The user turns on the projector 100 using the remote controller 1 (step S103). When the user pushes the menu button 103, the microcomputer 5 reads image data associated with an automatic setting screen from the internal memory and has the display device 10 display the automatic setting screen via the OSD signal generating circuit 11 and the driving circuit 16. Then, the automatic setting screen is projected on the screen 30 (step S104).

When the image projected on the screen 30 appears blurred, the user can appropriately adjust the focus using the remote controller 1 while viewing the projected image. It should be noted that the regular lens is used as the projection lens 17 here, and therefore, the user does not have to be concerned about the actual projection display size.

Accordingly, the microcomputer 5 reads the image data associated with a predetermined entry screen, such as the automatic setting screen, from the internal memory or generates image signals representing the results of predetermined calculations to have them projected on the screen 30. When this display processing performed by the microcomputer 5 is mentioned again in this specification, it may be simply expressed as ". . . screen is displayed on the screen 30."

Figure 9A:
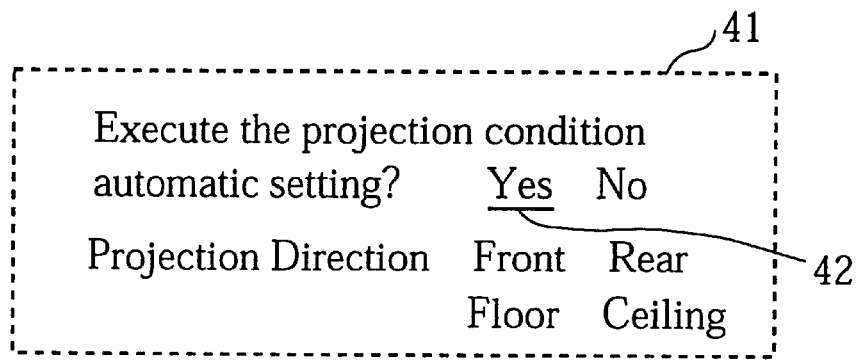
FIG. 9A is an automatic setting screen as an entry screen that is displayed on a screen of the projector.

FIG. 9A shows an example of the automatic setting screen. On an automatic setting screen 41 shown in FIG. 9A, the user can select ON or OFF (as indicated by "Yes" or "No" on the screen) as to whether the projection condition automatic setting is performed. The user can also select the projection direction. The user moves a cursor 42 to a desired position on this screen using the arrow buttons 104 of the remote controller 1 (shown in FIG. 7). When the user pushes the input button 102 with the cursor 42 being located in the desired position, the content shown in that position is confirmed. The microcomputer 5 stores the content entered by the user into the lens adjustment data memory 7.

"Front" is selected by the user when images are to be projected from the front side of the screen 30, while "Rear" is selected when images are to be projected from the rear side of the screen 30. "Floor" is selected when the projector 100 is placed on the floor, while "Ceiling" is selected when the projector 100 is inverted and suspended from the ceiling. Depending on these setting conditions, the microcomputer 5 determines whether the image displayed by the display device 10 is to be flipped from side to side or turned upside down. Consequently, the image is projected on the screen 30 in the correct orientation.

Figure 9B:
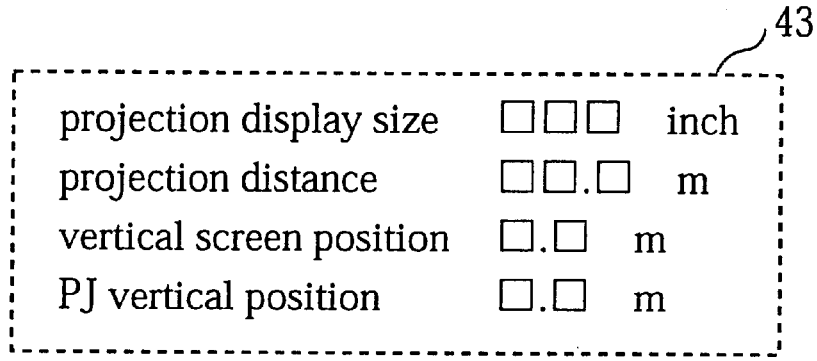
FIG. 9B is a projection condition inputting screen as an entry screen that is displayed on the screen of the projector.

When "Yes" is selected regarding whether the projection condition automatic setting is executed ("Yes" in step S105), an automatic setting mode becomes operational and a projection condition entry screen 43 as shown in FIG. 9B is displayed on the screen 30 (step S106).

As the projection display size, a value corresponding to the size of the screen 30 is inputted in inches. As the projection distance, the user inputs the value that was roughly calculated in step S101. The vertical screen position shown in the projection condition entry screen 43 refers to a distance measured from the bottom of the screen 30 to the floor, and this distance is indicated as L4 in FIG. 2. The PJ (projector) vertical position refers to a distance measured from the vertical center of the projection lens 17 to the floor, and his distance is indicated as L3 in FIG. 2. These distances L3 and L4 are obtained by actual measurement at the site. Note that the user makes these entries using the arrow buttons 104 of the remote controller 1. A value is increased when the user pushes the up arrow key and decreased when the user pushes the down arrow key. The user can move to a different entry item by pushing the right or left arrow key.

After completing the value entries, the user pushes the input button 102. Then, the microcomputer 5 judges that the value entries are completed ("Yes" in step S107), and proceeds to the set-condition calculation processing (step S108).

In the set-condition calculation processing, an optimum projection lens that meets the set projection conditions is selected from the plurality of projection lenses that are prepared for the projector 100. Also, a calculation is performed to obtain an optimum projection distance that is required to attain the specified projection display size using the selected projection lens.

Specifically, the microcomputer 5 selects the optimum projection lens and calculates the projection distance and the amount of vertical axis displacement adjustment, with reference to the values entered by the user and the preset data stored in he projection condition preset memory 6.

The projection condition preset memory 6 previously stores a table of the projection lens correlation data in the map format as shown in FIG. 10. As described earlier, this data map shows the correlation for each projection lens between a projection display size and a projection distance required to project an image with the projection display size.

The microcomputer 5 searches the projection lens correlation data, and selects a projection lens that has a projection distance enabling the projection display size that was entered by the user on the entry screen 43 in step. S106. In doing so, the microcomputer 5 selects a projection lens which has a projection distance that is the closest to the entered projection distance. Here, a difference between the projection distance of the selected projection lens and the projection distance entered by the user should be within a specified limit (100 mm, for example) so that the difference is adjustable.

As one example, suppose that the projection display size is entered as 450 inches and the projection distance is entered as 30 m (=30,000 mm). In this case, the microcomputer 5 first checks the projection distances of fixed-focus lenses shown in the column related to a 450-inch display size in FIG. 10. The microcomputer 5 calculates a difference between 30,000 mm and each projection distance of the lenses, and selects a projection lens that has a projection distance whose difference from 30,000 mm is within 100 mm. Of the four fixed-focus lenses shown in this column of FIG. 10, the projection distance of the type-2 lens is 30,841 mm and this is the closest to 30,000 mm. However, the difference between this projection distance and the entered projection distance is 841 mm, and this is far beyond the specified limit. For this reason, the microcomputer 5 cannot select this type-2 lens here.

Next, the microcomputer 5 refers to the zoom lens column related to the 450-inch display size. In doing so, the microcomputer 5 selects a projection lens whose variable projection distance includes 30,000 mm. As shown in FIG. 10, the type-6 lens should be selected in this case.

In the present embodiment, the specified limit is 100 mm and previously stored in the projection condition preset memory 6 as an adjustable range for a holding equipment 120 (shown in FIG. 25) of the projector 100. However, the user may arbitrarily set the limit at a different value.

As to a zoom lens, its projection distance continuously varies within a predetermined range. As such, it might be thought that the projection distance that is required to project images with a desired projection display size can be set as it was entered (that is, 30,000 mm in the present example). However, in the present embodiment, the projection distances of a zoom lens are stored in a projection lens adjustment table shown in FIG. 13 that will be used in lens automatic adjustment processing in step S112. In the present example, a value that is the closest to 30,000 mm, namely 30,004 mm, is set as the optimum projection distance.

Next, a distance difference $\Delta L$ (indicated as the vertical relative distance L2 in FIG. 2) between the distance measured from the vertical center of the screen 30 to the floor and the distance measured from the vertical center of the projection lens 17 to the floor.

The distance difference $\Delta L$ is calculated by the following equation. Note that Lv in this equation is a vertical length of the screen 30 (see FIG. 2).

$$\Delta L = L4 + (Lv/2) - L3$$

Figure 11:
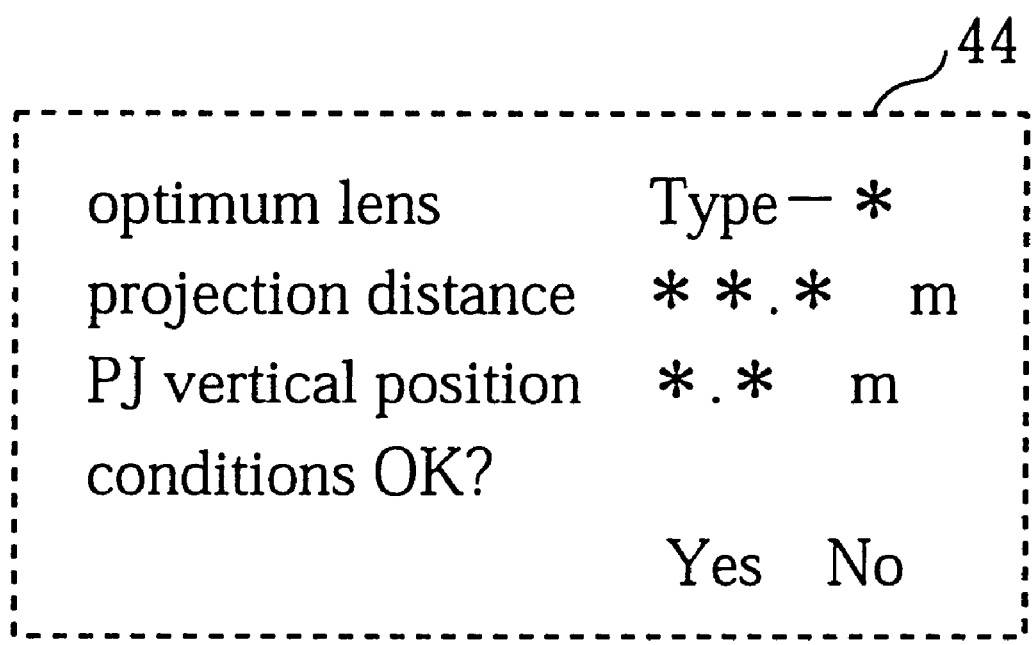
FIG. 11 is a screen showing calculation results that are obtained as contents of the projection conditions, the calculation being performed by a calculating unit provided in a projector 100.

A calculation result display screen 44 as shown in FIG. 11 is displayed on the screen 30 (step S109). The screen 44 shows the selected projection lens and calculation results.

With reference to the screen 44, the user replaces the current projection lens with the optimum projection lens, Also, the user actually measures the projection distance based on the displayed projection distance and repositions the projector 100 (step S110). Then, the user refers to the specifications of the projector 100 to judge whether the distance difference $\Delta L$ can be complemented through the vertical axis displacement adjustment. If so, the vertical position of the projector 100 does not need to be changed. If not, on the other hand, the height of a support table placed under the projector 100 is adjusted so that the difference $\Delta L$ comes within tolerance.

After this, the user enters "Yes" or "No" to confirm the conditions shown in the calculation result display screen 44 shown in FIG. 11 (step S111). If the vertical position of the projector 100 is changed or the projection distance cannot be appropriately set for any reason ("No" in step S111), the processing returns to step S106 so that the user can input new projection conditions and repeat the above operations.

Meanwhile, if the user confirms that the projector 100 is set according to the set conditions ("Yes" in step S111), the microcomputer 5 proceeds to step S112 and performs the lens automatic adjustment processing.

In the lens automatic adjustment processing, the microcomputer 5 automatically adjusts the state of the projection lens 17 to an optimum image projection state in accordance with the entered projection display size and projection distance. For doing so, the microcomputer 5 uses the vertical axis displacement driving unit 19, the focus driving unit 21, and the zoom driving unit 22.

Figure 12:
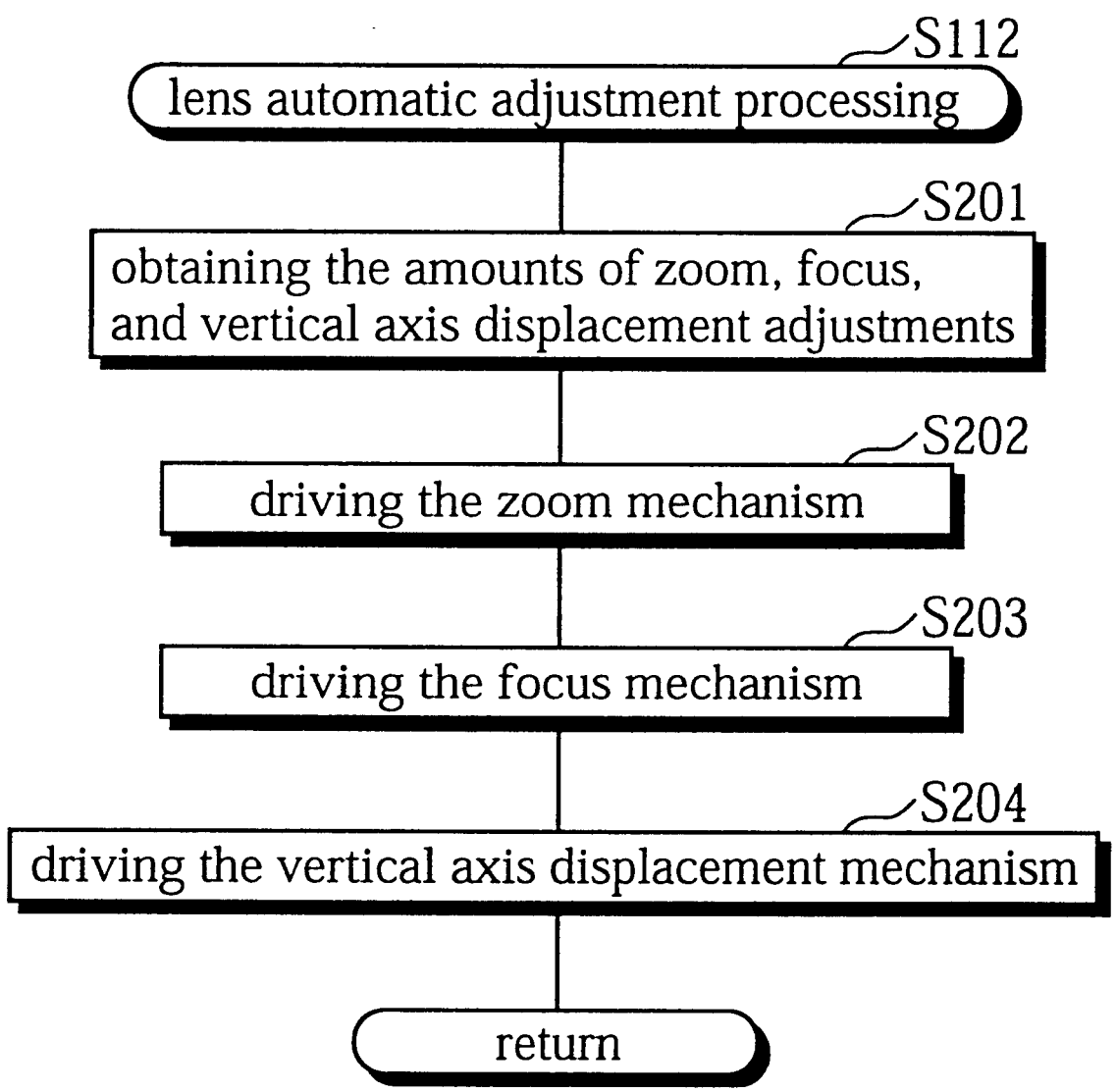
FIG. 12 is a flowchart of the projection lens automatic adjustment processing performed in step S112 of the main flowchart shown in FIG. 8.

FIG. 12 is a flowchart showing the subroutine of the lens automatic adjustment processing. From the selected projection lens, projection distance, and distance difference $\Delta L$, the microcomputer 5 obtains the amounts of zoom adjustment, focus adjustment, and vertical axis displacement adjustment.

Suppose that a zoom lens is selected as the projection lens 17 as in the present example. In this case, the zoom ratio is obtained from the ratio of the size of the display device 10 to the projection display size of the screen 30. Based on the zoom ratio and projection distance, a necessary focal length of the projection lens 17 is found.

From the focal length, a distance between the projection lens 17 and the display device 10 in the optical axis direction is specified according to a common optical image-forming equation. Then, the amount of focus adjustment required to move the projection lens 17 is found to satisfy the specified distance between the projection lens 17 and the display device 10.

Strictly speaking, a distance between the projection lens 17 and the screen 30 varies due to the focus adjustment and, as a result, the projection display size of the screen 30 also slightly varies. As such, it is desirable to perform the focus adjustment without changing the projection display size while keeping the interrelationship between the zoom and the focus.

Under the circumstances, the relation between the amounts of zoom and focus adjustments that are made to have the projected image come into focus without changing the projection display size is obtained in advance, in the present embodiment. The relation is obtained for each projection lens based on the lens characteristics, and is stored as the projection lens adjustment table in the projection condition preset memory 6. With reference to this preset data table, the amounts of zoom and focus adjustments are determined. As one example, FIG. 13 shows the projection lens adjustment table that is referred to when the projection display size is 450 inches and the type-6 lens is selected as the projection lens 17.

As shown in the table of FIG. 13, the projection distances range from 27,504 mm at the minimum to 48,875 mm at the maximum. The projection distances increase by 100 mm, although the interval between the last two distances (that is, between 48,804 mm and 48,875 mm) is 71 mm. In this table, the amounts of zoom and focus adjustments required to attain the 450-inch projection display are stored in association with each other for each projection distance.

Each amount of zoom and focus adjustments is indicated by the number of pulses to drive the corresponding driving motor with a state where the projection lens 17 is in its standard position. The numbers of pulses are previously calculated for each projection lens and each projection display size through the well-known optical calculation or a computer simulation. The values representing the numbers of pulses are stored as the projection lens adjustment table in the projection condition preset memory 6. Note that the projection lens adjustment table is formed for each zoom-type projection lens and for each projection display size.

In the present embodiment, the type-6 projection lens is selected as the projection lens 17 and the projection distance is set at 30,004 mm in step S110 in order to attain the 450-inch projection display size. As shown in the table of FIG. 13, the amounts of zoom and focus adjustments are respectively represented as pm and qm pulses.

Supposing that the display size of the display device 10 is K-inch, a zoom ratio M of the projection lens 17 is obtained by calculating 450/K. Thus, the display device 10 should be moved by ΔL/M in the direction opposite to the direction in which the difference exists with respect to the optical axis of the projection lens 17.

As described earlier, however, the adjustment to the vertical axis displacement is performed by moving the projection lens 17 in the present embodiment. In order to move the projection lens 17 by ΔL/M in the vertical direction, the number of pulses to drive the vertical axis driving motor 23 should be found.

The relation between the number of pulses to drive the vertical axis driving motor 23 and the amount of axis displacement adjustment is readily understood. To be more specific, the number of driving pulses that is necessary for a rotor of a stepping motor to make one turn is previously known. Therefore, the number of pulses required here to drive the vertical axis driving motor 23 can be calculated from the known number of driving pulses and a length of one pitch of the bolt 231.

In accordance with each control parameter, i.e. the number of pulses, corresponding to the obtained amounts of zoom, focus, and vertical axis displacement adjustments, the microcomputer 5 drives the driving motors 26, 25, and 23 via the zoom driving unit 22, the focus driving unit 21, and the vertical axis displacement driving unit 19 (steps S202 to S204). Subsequent to the completion of the lens automatic adjustment processing, the processing returns to the flowchart of FIG. 8.

Using the conventional technique, the user separately makes the adjustments to the zoom, focus, and vertical axis displacement while viewing the image projected on the screen. These adjustments take much time since each adjustment process needs to be repeated until the projection state of the projector converges on the optimum state. By means of the present invention, however, the time taken for the adjustments is remarkably reduced.

In the present embodiment, the user enters the projection conditions, such as a projection display size and projection distance, in the interactive manner using the remote controller on the entry screen displayed in the on-screen display state. Thus, the setting of projection conditions performed in the simulation is simplified. Moreover, the setting for driving the projection lens system is automatized. These settings are achieved through simple input operations. Principally, these interactive operations and automatic settings can be realized only by adding programs, and so can be achieved at low costs.

Second Embodiment

In the first embodiment, the explanation is mainly given to the automatic control for the adjustments that are made to the zoom, focus, and vertical axis displacement of the projector 100 to attain the desired projection display size. With this automatic control, an image having a rough adjustment level within the specific limit is projected on the screen 30. The adjustments as described are adequate in a case where the projection performance does not need to be so high, such as in the case of a commercial presentation. However, adjustments with a higher degree of precision will be necessary when a high definition is required in an entire projected image, such as a case where the projector is permanently installed in a hall or the like to show high-definition images.

In the second embodiment, the explanation will be given to a construction related to fine adjustments that are made to the conditions set for the projector 100. The construction serves the purpose of attaining a higher precision level for projected images. Hereinafter, the fine adjustments at a higher degree of precision are referred to as the "high-precision adjustments." Here, suppose that the high-precision adjustments are performed after the adjustments have been roughly performed to the projection conditions through the manual or stated automatic control. The adjustments that are roughly performed are referred to as the "rough adjustments" hereinafter.

The entire construction of the projector 100 of the second embodiment is the same as the construction shown in FIG. 5. Therefore, the explanation of the construction is omitted in the present embodiment. The following description will focus on the procedure of the high-precision adjustments and the control by the control system 100A.

FIG. 14 is a flowchart showing the procedure of the high-precision adjustments including the control by the microcomputer 5.

When the user pushes the menu button 103 of the remote controller 1, the microcomputer 5 reads image data associated with a rough adjustment confirmation screen 45 shown in FIG. 15A from the internal memory and has this screen 45 projected on the screen 30 (step S301).

Then, the user assesses the projection state resulting from the rough adjustments (step S302). If judging that the projection state is not preferable, the user selects "No" in the screen 45. The user then selects "Small" or "Large" regarding the current projection display size and further selects "Right", "Left", "Upper", or "Lower" as a position having an inappropriate projection state. After making these selections, the user pushes the input button 102.

If the projection state resulting from the rough adjustments has been judged not to be preferable ("Yes" in step S302), the microcomputer 5 has a readjustment instruction screen 46 shown in FIG. 15B projected on the screen 30 (step S303). Then, the user adjusts the setting position of the projector 100 while viewing the screen 30 (step S304). Here, it would be helpful to the user if the way to correct the setting direction of the projector 100 is displayed on the screen 30 to conform to the contents entered by the user in the screen 45 of FIG. 15A. As one example, the screen 30 may display a message like "Slightly move the projector backward" when the current projection size was entered as "Small."

Then, the user reassesses the projection state improved by the addition of readjustment to the rough adjustment, and enters "Yes" or "No" answering to the question "Readjustment OK?" in the screen 46 of FIG. 15B. If the user selects "No" ("No" in step S305), the processing returns to step S301 and the rough adjustment confirmation screen 45 is displayed on the screen 30 in order for the user to reenter the inappropriate setting of the rough adjustment. Then, the processes up to S304 are repeated. When the user enters "Yes" in the readjustment instruction screen 46 ("Yes" in step S305), a high-precision adjustment select screen 47 as shown in FIG. 15C is displayed on the screen 30 (step S306).

It should-be noted here that the steps S301 to S305 may be omitted since these steps are executed simply to confirm the setting state of the projector 100 at the rough adjustment level before the high-precision adjustments are performed.

When the higher projection level is required, the user enters "Yes" in the high-precision select screen 47 using the remote controller 1 (step S307). Following this instruction from the user, the microcomputer 5 has the test pattern generating circuit 12 generate image data associated with a test pattern 150 shown in FIG. 16, and has the display device 10 display the test pattern 15 which is then projected on the screen 30 (step S308). At the same time, an adjustment entry screen 50 as shown in FIG. 19A is also projected in the position whereby the test pattern 150 and the screen 50 would not exactly coincide on the screen 30.

Figure 16:
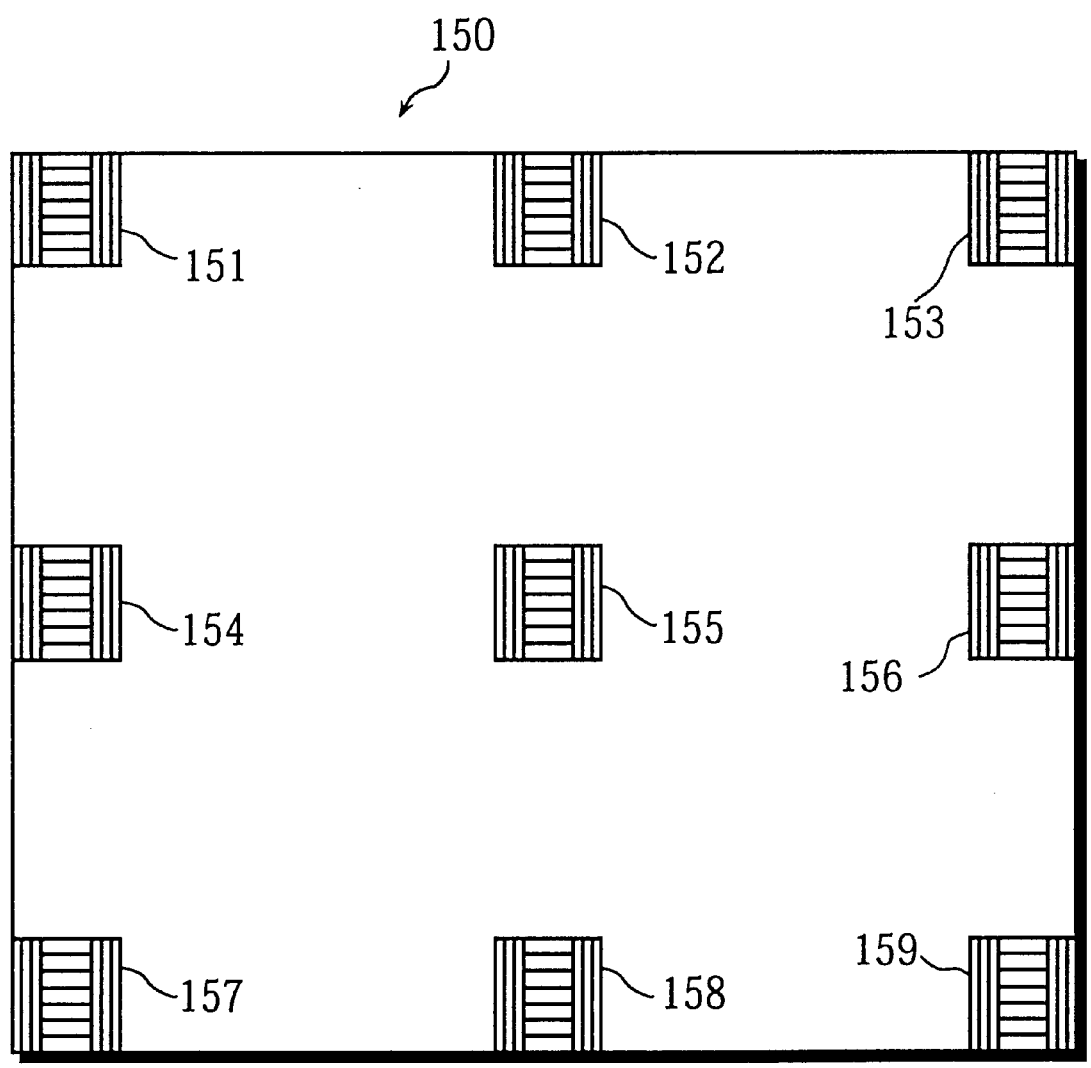
FIG. 16 is an example of a test pattern that is displayed for the high-precision adjustments in the second embodiment.

As shown in FIG. 16, the test pattern 150 is formed in a rectangular region that corresponds to a display area of the screen 30, and is made up of nine pattern images 151 to 159. The pattern images 151, 153, 157, and 159 are respectively formed at the four corners of the rectangular region. The pattern images 152, 154, 156, and 158 are respectively formed at the middle points of the four edges of the rectangular region. The pattern image 155 is formed at the center of the rectangular region. Hereinafter, points corresponding to the pattern images 151 to 159 whose projection states are to be adjusted are respectively referred to as adjustment points 1, 2, . . . , and 9. The high-precision adjustments are performed as follows in accordance with the projection states of the pattern images 151 to 159.

Figure 17:
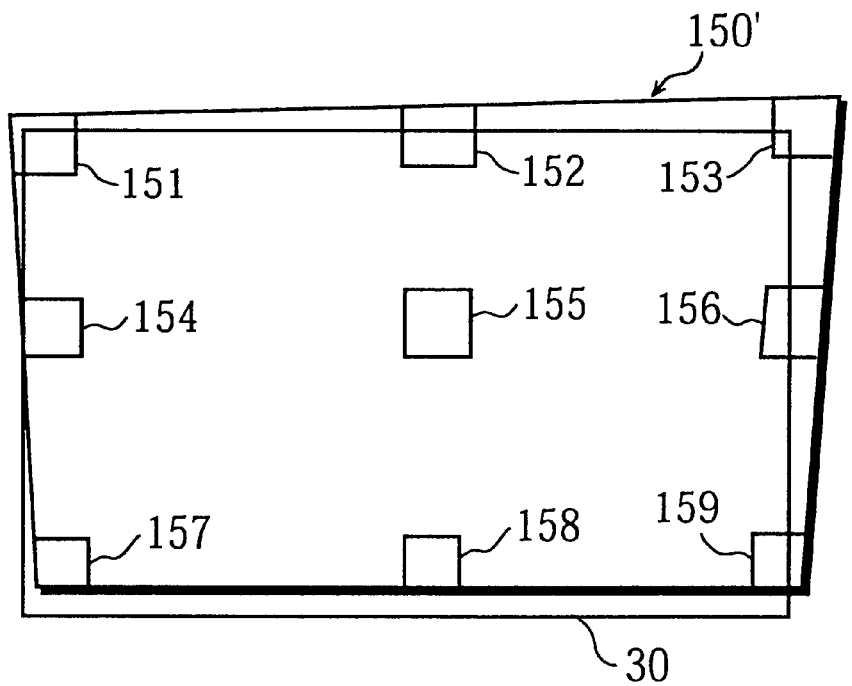
FIG. 17 shows a case where a projection position of the test pattern does not coincide with a correct display position of the screen.
Figure 18:
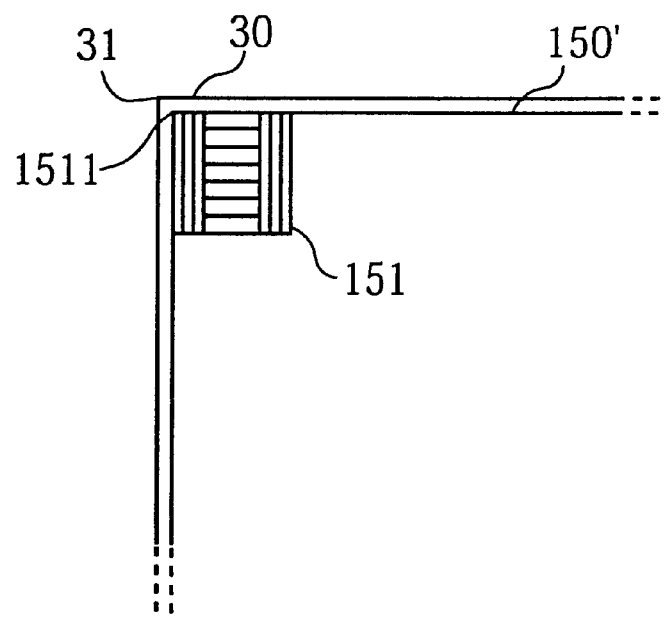
FIG. 18 shows a case where a projection position of a top-left pattern image coincides with the corresponding corner of the screen.

When the positional relation between the projector 100 and the screen 30 does not conform to the specification requirements, an image projected on the screen 30 is distorted as compared with an ideal image and optimum focusing cannot be achieved at every part in the display area of the screen 30. FIG. 17 shows such unfavorable projection state. Note that the distortion of the projected image shown in FIG. 17 is considerably exaggerated for the purpose of explanation. Also note that only the outlines of the pattern images 151 to 159 are drawn in FIG. 17.

Viewing a test pattern 150' projected on the screen 30 in the state shown in FIG. 17, the user can at least see that the projector 100 is inclined toward the upper-right as compared with an ideal inclination of the projector 100. However, the projection state has been adjusted in the stage of the rough adjustments, so that the image distortion and extension of the image off the display area of the screen 30 may be hard to see for the user. For this reason, the user cannot be sure about how to adjust the setting direction of the projector 100 in what direction, and these fine adjustments conventionally require much effort.

By means of the present invention, however, the adjustments are easily performed according to the following procedure.

The user executes an optimum adjustment for each adjustment point by using the remote controller 1 on the adjustment entry screen 50 shown in FIG. 19A while viewing the projection state of the corresponding pattern image 151 to 159 (step S309).

The user first selects the adjustment point 1 on the adjustment entry screen 50 using the remote controller 1. While viewing the pattern image 151, the user adjusts the focus and zoom as well as adjusting the projection position in the vertical and horizontal directions so that a top-left corner 1511 of the pattern image 151 coincides with a top-left corner 31 of the screen 30.

When the test pattern 150 is projected as the test pattern 150' in the state as shown in FIG. 17, the user first decreases the zoom ratio in the zoom adjustment before adjusting the focus of the pattern image 151. The user then performs adjustments using the remote controller 1 as if adjusting the optical axis of the projection lens 17 in the vertical and horizontal directions so as to have the top and left edges of the pattern image 151 coincide with the corresponding edges of the screen 30.

After the completion of the adjustments for the pattern image 151, the user instructs to store data regarding the adjustments using the remote controller 1. This data is referred to as the "adjustment data" and is indicated as the numbers of driving pulses to drive the corresponding motors from their standard positions in the respective directions. Receiving the instruction, the microcomputer 5 stores the adjustment data in association with the adjustment point 1 in an adjustment storing table as shown in FIG. 20, the table being provided in the lens adjustment data memory 7 (step S309).

The above adjustment operation is sequentially performed for the other adjustment points 2 to 9. When the operations are completed for all of the adjustment points 1 to 9 ("Yes" in step S310), the microcomputer 5 calculates errors between the current setting position and the ideal setting position of the projector 100 using the adjustment data stored in the adjustment storing table (step S311).

Each of the pattern images 151, 153, 157, and 159 respectively projected at the four corners of the screen 30 is preferably adjusted to a state where a corner of the pattern image coincides with the corresponding corner of the screen 30. Each of the pattern images 152, 154, 156, and 158 respectively projected at the middle points of the edges is adjusted to a state where only one edge coincides with the corresponding edge of the screen 30. As to the pattern image 155 projected at the center of the screen 30, only the focus is adjusted.

Calculations are performed in step S311 to obtain five values representing errors in the projection distance, horizontal and vertical inclinations, and horizontal and vertical positions. These calculations are described in detail later.

In step S312, a calculation result display screen 51 as shown in FIG. 19B is displayed on the screen 30. The five values obtained as the calculation results of step S311 are displayed on the calculation result display screen 51. In accordance with the values shown on the screen 51, the user makes the fine adjustments to the current setting position of the projector 100 (step S313). After the completion of the fine adjustments, the user confirms the high-precision adjustments while viewing the test pattern 150 projected on the screen 30. If judging the projection state to be satisfactory, the user enters "No" for continuing the high-precision adjustments in the calculation result display screen 51 using the remote controller 1 ("No" in step S314). Accordingly, the high-precision adjustments are terminated.

On the other hand, if judging the projection state to be unsatisfactory, the user enters "Yes" for continuing the high-precision adjustments in the calculation result display screen 51 using the remote controller 1 ("Yes" in step S314). Then, the processing returns to step S308 in order for the user to repeat the adjustment entries for the pattern images 151 to 159.

Figure 21:
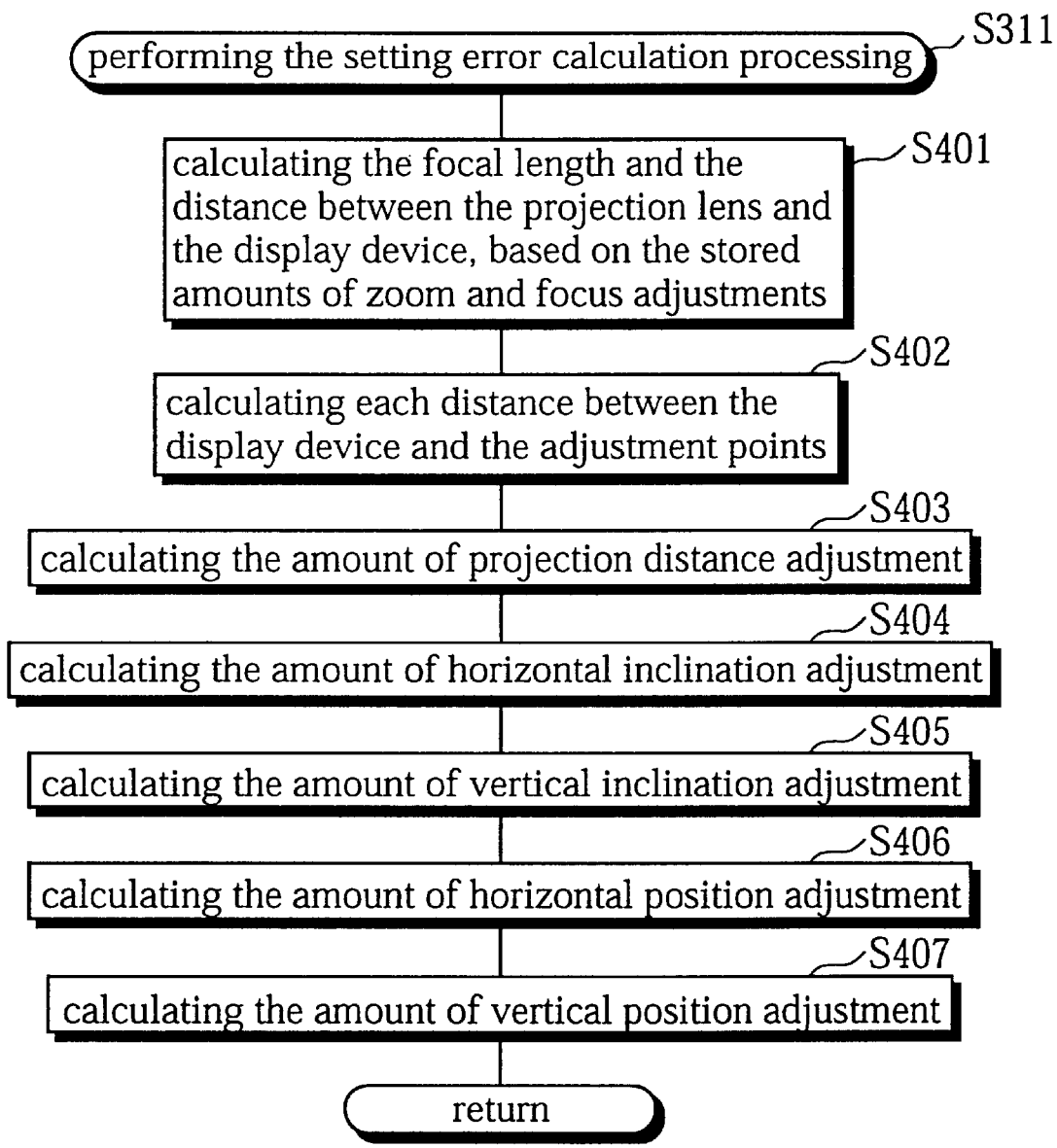
FIG. 21 is a flowchart of setting error calculation processing performed in step S311 included in the main flowchart shown in FIG. 14.

Next, the setting error calculation processing performed in step S311 of FIG. 14 is explained. FIG. 21 is a flowchart showing the procedure of the setting error calculation processing.

Based on the amounts of zoom and focus adjustments stored for each adjustment point in the adjustment storing table shown in FIG. 20, a focal length F of the projection lens 17 and a distance between the projection lens 17 and the display screen of the display device 10 are calculated (step S401).

As described above, the amount of zoom adjustment is indicated as the number of driving pulses. In accordance with this number of driving pulses, the driving motor 26 rotates the movable cylinder 176. The focal length is uniquely determined by the number of driving pulses. A table or function indicating this relation is stored for each zoom lens in the projection condition preset memory 6, so that the focal length F can be readily obtained using the table or function.

Similarly, the number of driving pulses to drive the focus driving motor 25 is obtained from the amount of focus adjustment shown in the adjustment storing table. Based on this number of driving pulses, the amount to move the projection lens 17 from its standard position in the optical axis direction is found. Based on this amount, the distance between the projection lens 17 and the display screen of the display device 10 is calculated.

Figure 22:
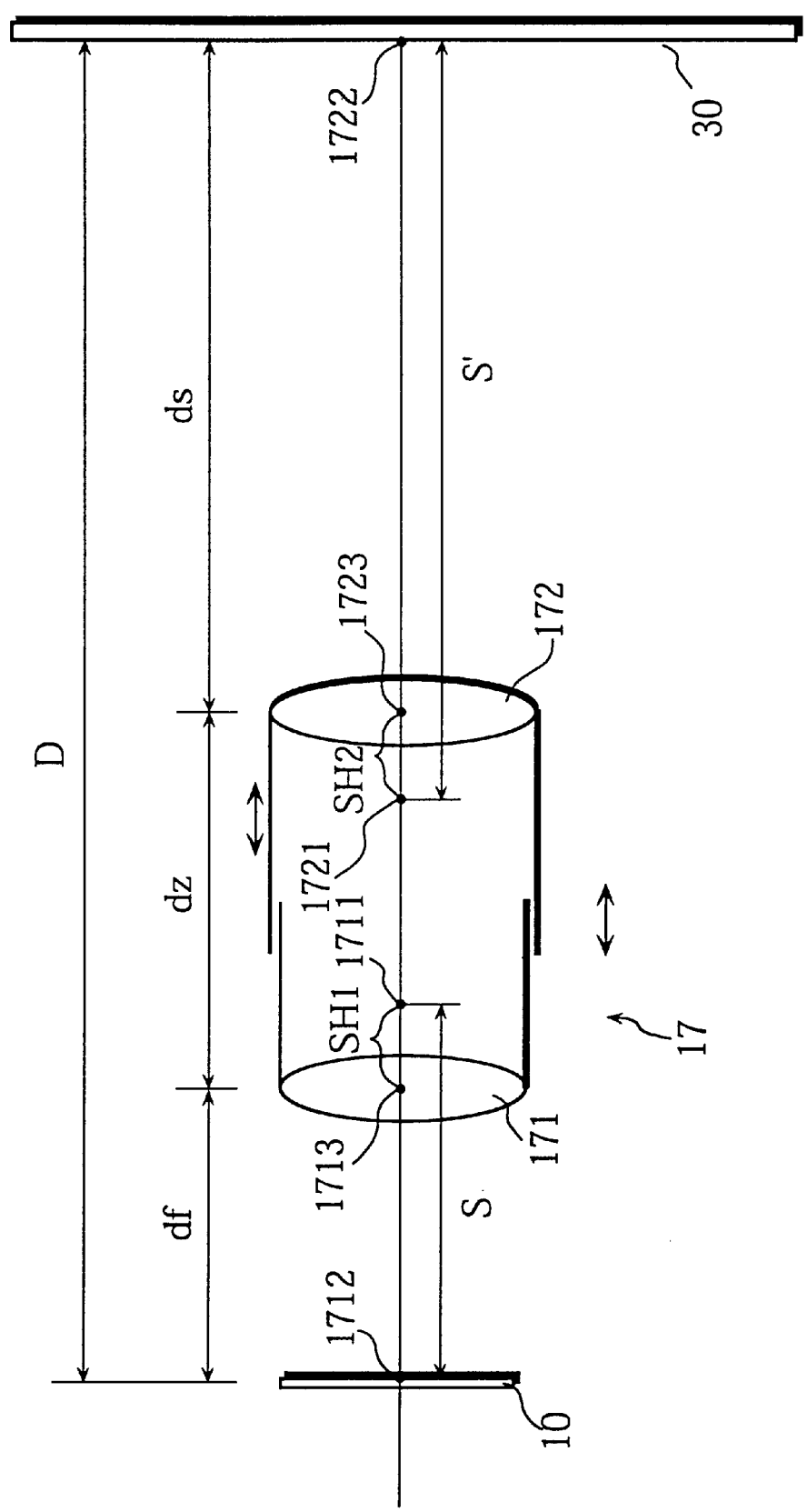
FIG. 22 shows a positional relation among a display device, projection lens, and screen to help explain the setting error calculation processing.

Using the focal length F and the distance between the projection lens 17 and the display device 10, each distance between the projection lens 17 and the adjustment points can be calculated. The calculations are performed according to a common optical image-forming formula applied to a combination of lenses. FIG. 22 is a drawing to help explain a method of calculating the distance. For convenience of illustrating, the projection lens 17 is shown as being composed of only a first lens 171 located on the display device side and a second lens 172 located on the screen side.

In FIG. 22, a distance dz indicates a distance between the first and second lenses 171 and 172, and this distance dz can be calculated from the amount of zoom adjustment. Specifically, supposing that this distance is dz0 when the projection lens 17 is in the standard position and that the amount of adjustment is Δdz, the distance dz is calculated according to the following equation.

$$dz = dz0 + \Delta dz$$

A distance df indicates a distance between the display device 10 and the first lens 171. This distance df can be calculated as is the case with the distance dz. Specifically, the distance df can be obtained by adding the amount of adjustment to the distance that is found when the projection lens 17 is in the standard position.

Suppose that the focal lengths of the first and second lenses 171 and 172 are f1 and f2, and that the focal length of the lens pair (i.e. the projection lens 17) is F. In this case, the well-known relation is established as indicated by the following equation.

$$SH1 = (f1 \cdot dz)/(f1 + f2 - dz) \qquad 1$$

Also suppose that distances between the first lens 171 and a first principal point 1711 and between the second lens 172 and a second principal point 1721 are SH1 and SH2. In this case, the distances SH1 and SH2 are respectively calculated by the following equations.

$$SH1 = (f1 \cdot dz)/(f1 + f2 - dz) \qquad 2$$

$$SH2 = (-f2 \cdot dz)/(f1 + f2 - dz) \qquad 3$$

As shown in FIG. 22, a distance measured along the optical axis of the projection lens 17 between a point 1712 on the display device 10 and the first principal point 1711 is indicated as S. Also, a distance measured along the optical axis between the second principal point 1721 and a point 1722 on the screen 30 is indicated as S'. In this case, the following image-forming equation is formulated.

$$1/S' - 1/S = 1/F \qquad 4$$

The distance S can be obtained by calculating df+SH1, and the focal length F can also be calculated according to the equation 1. These values are substituted into the equation 4, so that the distance S' can be found.

A distance ds between the second lens 172 and the point 1722 on the screen 30 is calculated by subtracting the distance SH2 from the distance S'. By adding the values df and dz to the distance ds, a distance D measured along the optical axis between the point 1712 on the display device 10 and the point 1722 on the screen 30 is obtained. In reality, the projection lens 17 is composed of a plurality of lenses more than two. Specifically, the projection lens 17 includes combinations of lens pair, which has been described as the first and second lenses 171 and 172 for example. Regardless of the number of lenses comprising the projection lens 17, the distance D will be found according to the equations formulated through the same principles as explained above.

The calculating unit 4 performs the above calculations for each of the adjustment points 1 to 9 so as to obtain distances D1 to D9 respectively measured from the display device 10 (step S402).

From the values of the distances D1 to D9, the amount of adjustment made to the projection distance is calculated as an error (step S403). More specifically, the calculating unit 4 calculates a difference between the current projection distance and the distance D5 related to the center adjustment point 5 or the mean value of the distances D1 to D9.

Figure 23:
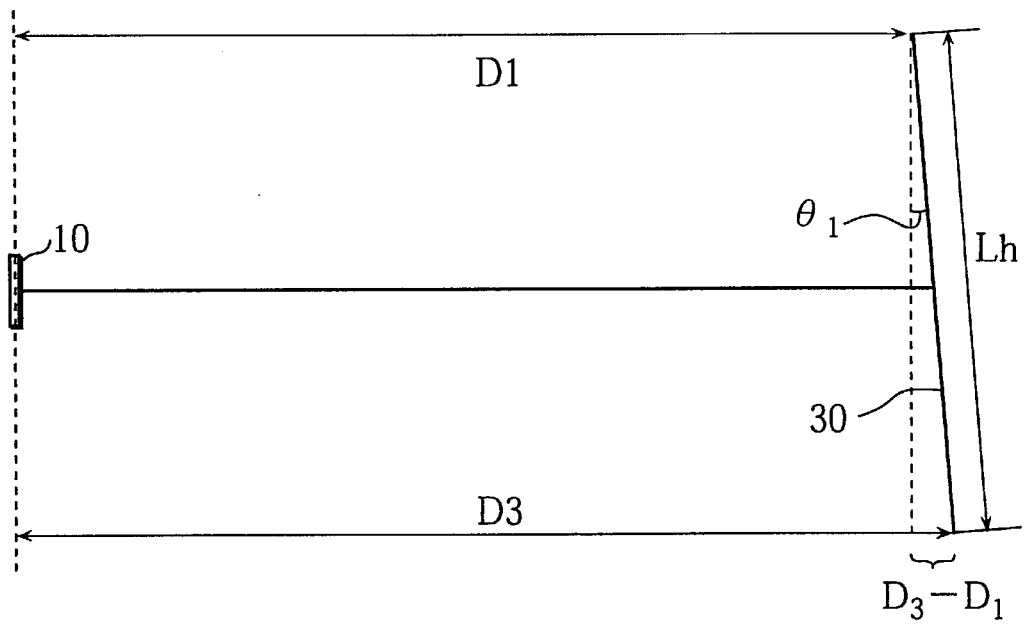
FIG. 23 is a drawing to help explain a relative inclination of the display device and the screen in the horizontal direction.

Next, the calculating unit 4 obtains the amount of adjustment to be made to the horizontal inclination from differences between some of the distances D1 to D9 (step S404). FIG. 23 is a drawing to help explain a horizontal positional relation between the display device 10 and the screen 30. For the purpose of simple explanation, suppose that the display surface of the display device 10 is set perpendicular to the optical axis of the projection lens 17. Also suppose that the adjustment points 1, 3, 7, and 9 used in this inclination adjustment respectively correspond to the top-left, top-right, bottom-left, and bottom-right corners of the screen 30.

Now suppose that the distance D1 between the display device 10 and the top-left adjustment point 1 and the distance D3 between the display device 10 and the top-right adjustment point 3 are measured as shown in FIG. 23. In this case, the relative inclination in the horizontal direction between the display device 10 and the screen 30, that is, a horizontal adjustment angle θ1, is readily obtained by the following equation with respect to the adjustment point 1.

$$\sin θ1 = (D3-D1)/Lh$$

Figure 3:
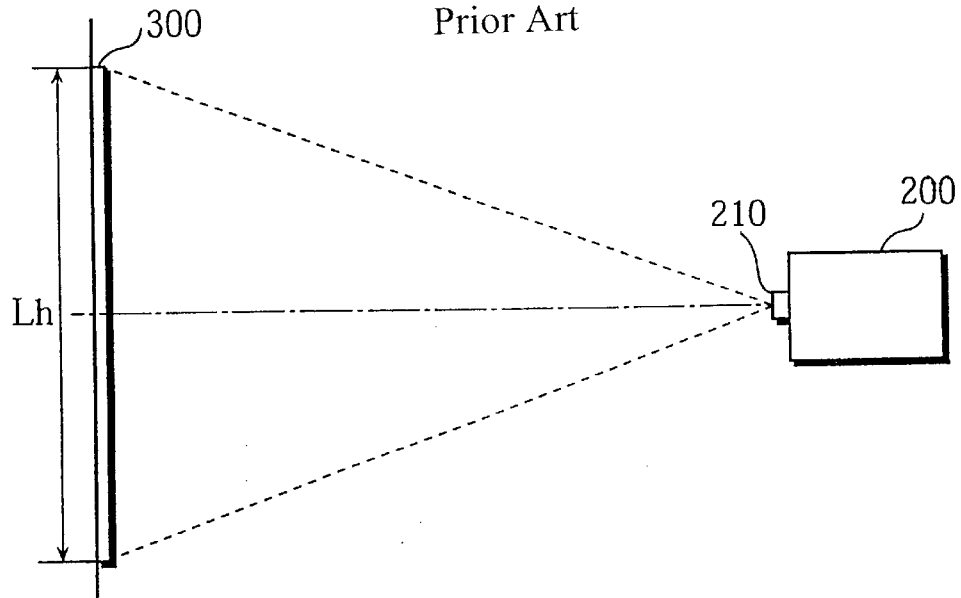
FIG. 3 shows the positional relation in the horizontal direction between the projector and the screen.
Figure 4:
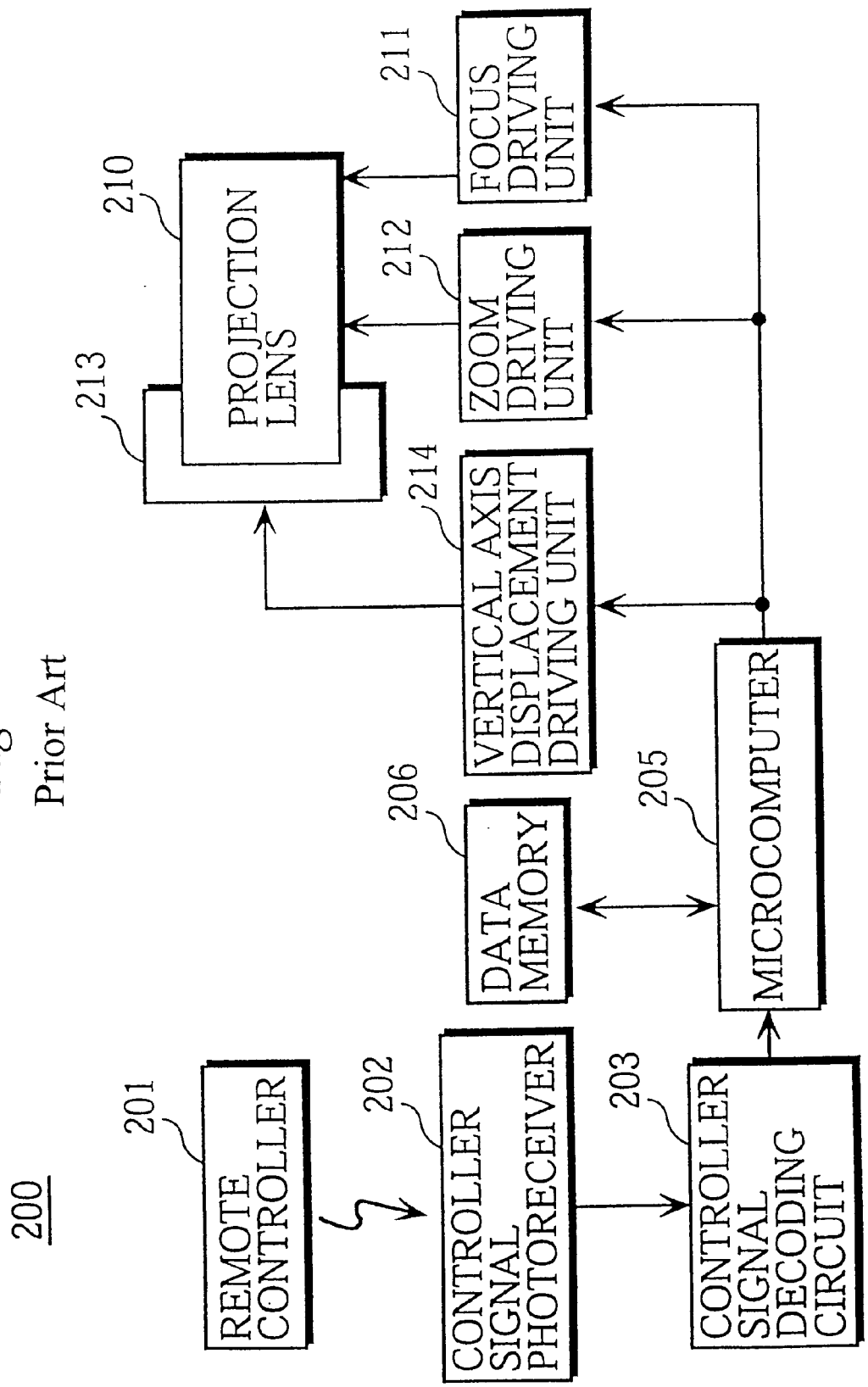
FIG. 4 is a block diagram showing the construction for driving and controlling the projection lens of the conventional projector.

Here, Lh indicates a horizontal length of the screen 30 (see FIG. 3). The length Lh is previously known for each screen size and stored in association with the screen size in the projection condition preset memory 6. The size has been entered as 450 inches in the present embodiment, and the corresponding value Lh is determined with reference to the values stored in the projection condition preset memory 6.

The angle θ1 is an adjustment angle in the horizontal direction. As can be understood, the inclination of the screen 30 that has been installed cannot be changed. Thus, the horizontal angle of the projector 100 is adjusted. It should be obvious that the direction in which the inclination of the projector 100 is adjusted (toward the right or left) is different depending on the value of (D3−D1) that is positive or negative. For example, when the projector 100 is to be inclined toward the left, the value of the angle θ1 is indicated as positive on the calculation result display screen 51. Meanwhile, when the projector 100 is to be inclined toward the right, the value of the angle θ1 is indicated as negative on the screen 51.

Here, an adjustment angle θ1' may be calculated using the distances D1 and D2 related to the adjustment points 1 and 2, the adjustment point 2 being located on the middle point of the top edge. In this case, the angle θ1' is also obtained with respect to the adjustment point 1, and a mean value between the angles θ1 and θ1' may be determined as the horizontal adjustment angle. By doing so, a degree of precision in the adjustments can be improved.

Next, a vertical adjustment angle θ2 is calculated using the distances D1 and D7 related to the adjustment points 1 and 7, the adjustment point 7 being located at the bottom-left corner (step S405). The angle θ2 is also obtained with respect to the adjustment point 1 and used to adjust the inclination of the projector 100 in the vertical direction. As is the case with the calculation of the horizontal adjustment angle, the vertical adjustment angle θ2 is calculated according to the following equation (step S405).

$$\sin θ2 = (D7-D1)/Lv$$

Figure 1:
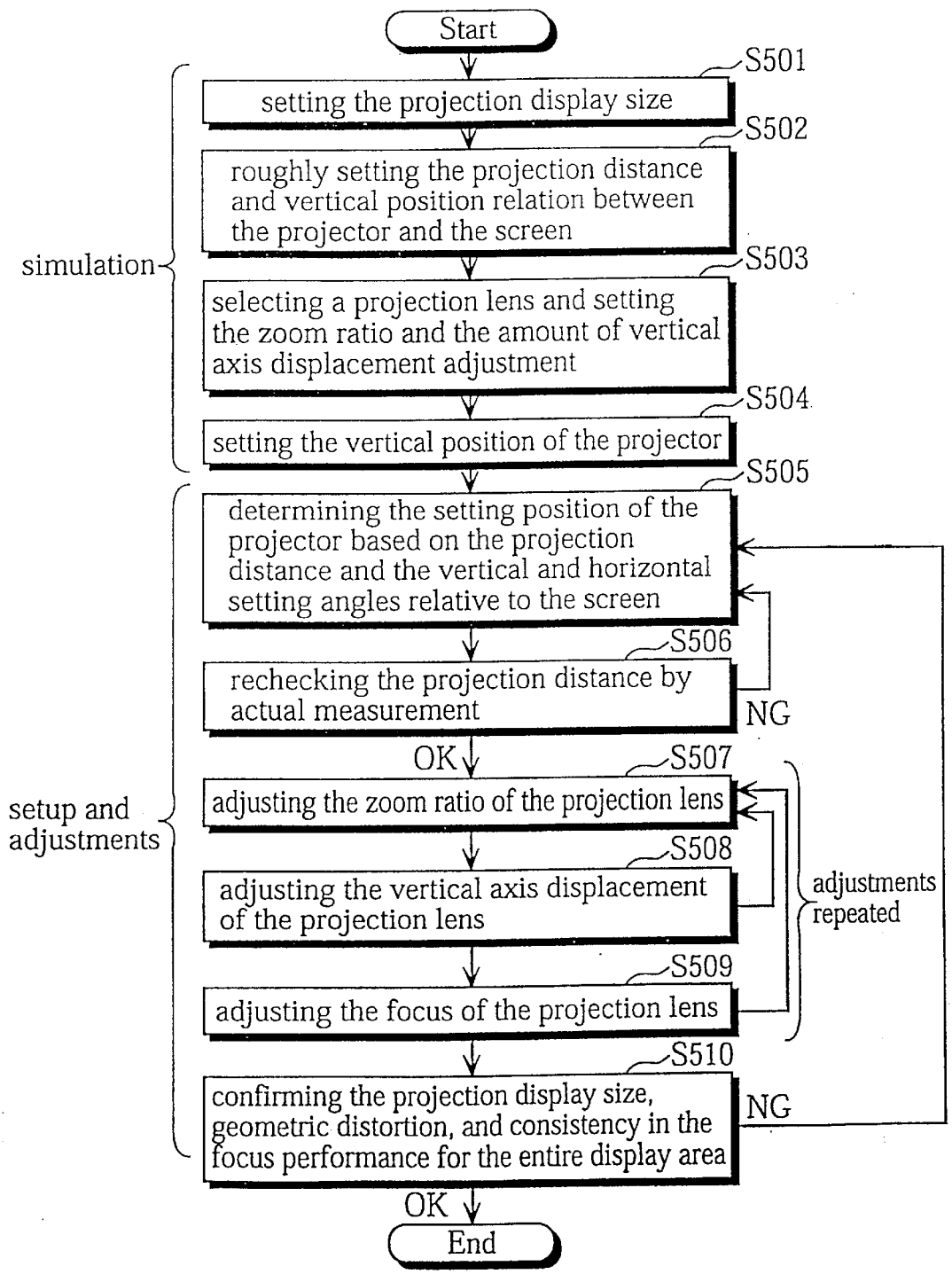
FIG. 1 is a flowchart showing the procedure of setting a conventional projector, the procedure including the setting of the projection conditions, setup of the projector, and adjustments to the projector.
Figure 2:
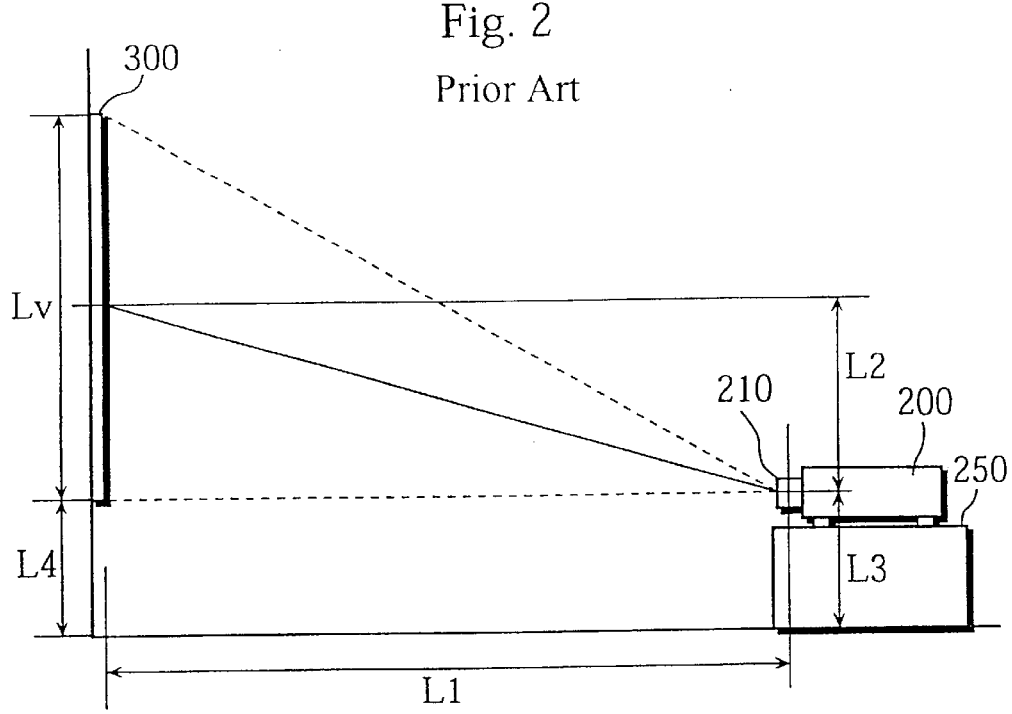
FIG. 2 shows the positional relation in the vertical direction between the projector and the screen.

Here, Lv indicates a vertical length of the screen 30 (see FIG. 2).

After the horizontal and vertical adjustment angles are obtained, the amounts of adjustments to be made to the image projecting position in the horizontal and vertical directions are calculated (steps S406 and S407).

Figure 24:
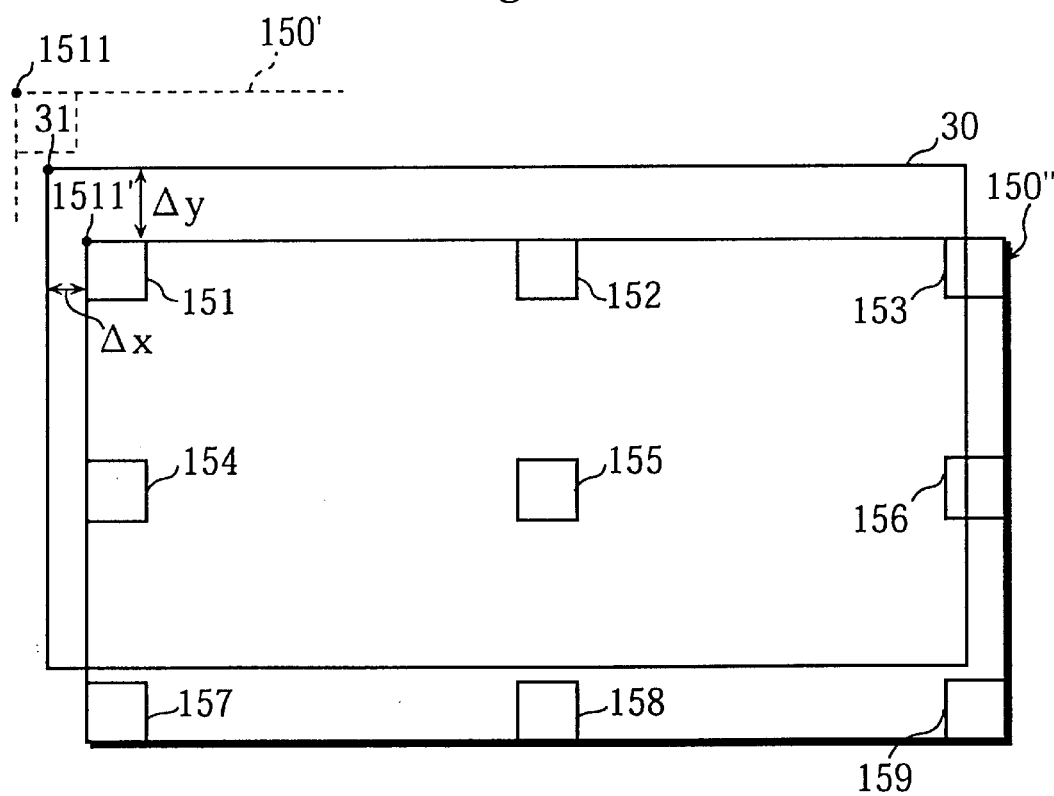
FIG. 24 is an example showing a positional relation between the projected test pattern and the screen after the relative inclination between the display device and the screen is adjusted.

Since the horizontal and vertical inclinations of the projector 100 have been adjusted, the test pattern 150 must be projected as a test pattern 150" on the screen 30 as shown in FIG. 24. As shown in this figure, although a bounding rectangle of the test pattern 150" is in the same shape as the screen 30 but does not coincide with the screen 30 in the horizontal and vertical directions. In order to have the test pattern 150" projected on the screen 30 at the correct position, a corner point 1511' of the pattern image 151 is shifted by Δy parallel to itself in the vertical direction and also shifted by Δx parallel to itself in the horizontal direction so as to coincide with the top-left corner 31 of the screen 30.

The values Δx and Δy are calculated as follows. The adjustments to the zoom ratio, focus, and horizontal and vertical axis displacement were performed on the original corner point 1511 of the pattern image 151 of the test pattern 150' so that the corner point 1511 would coincide with the top-left corner 31 of the screen 30. As such, this original position of the corner point 1511 with respect to the corner point 31 of the screen 30 can be obtained through an inverse operation in accordance with the stored amounts of adjustments.

As described above, the corner point 1511' is formed at the current position since the angle adjustments were made to the original corner point 1511. This is to say, the current position of the corner point 1511' can be calculated from the position information of the corner point 1511, adjustment angles θ1 and θ2, and adjusted projection distance. These calculation processes can be realized according to the common geometric knowledge and, therefore the detailed explanation is omitted in this specification.

Accordingly, the calculation result display screen 51 shows the displacements Δx and Δy in the horizontal and vertical directions between the corner point 31 of the screen 30 and the corner point 1511' formed after the angle adjustments, as the horizontal and vertical position adjustments.

In the present embodiment, the adjustments are performed for each of the nine pattern images 151 to 159. From the adjustments, five values representing errors are simultaneously calculated. These five values respectively correspond to the errors in the projection distance, horizontal inclination, vertical inclination, horizontal projection position, and vertical projection position. However, the user can make the adjustments to the horizontal and vertical projection positions while viewing the pattern image 151 that is projected on the screen 30. As such, only the amounts of adjustments to be made to the projection distance, horizontal inclination, and vertical inclination may be first calculated and displayed on the screen 30 for the user. Subsequent to this, the user may have the vertical axis displacement driving motor 23 and the zoom driving unit 24 driven via the vertical axis displacement driving unit 19 and the horizontal axis displacement driving unit 20 using the remote controller 1 so that the corner point of the pattern image 151 coincides with the top-left corner of the screen 30.

The amounts of adjustments obtained in the high-precision adjustments may be stored in the projection condition preset memory 6. By doing so, readjustments can be easily performed with reference to this stored data when the projector 100 needs the readjustments in the future.

By means of the present embodiment as described above, the user can achieve the high-precision adjustments only by separately adjusting the projection states of the pattern images located at the adjustment points while viewing the pattern images projected on the screen 30. Conventionally, an experienced user has to perform the simulation for setting projection conditions, set up the projector, and execute the high-precision adjustments to the projection lens system. Although these operations have occupied a large portion in the number of necessary man-hours, the present invention considerably simplifies and partially automatizes these operations.

<Modifications>

The present invention has been described by way of the preceding embodiments, although it should not be construed as being limited to the specific examples used therein. Example modifications of these embodiments are given below.

(1) In the first embodiment, the user inputs the projection conditions so that an optimum projection lens that meets the projection conditions is selected. The selected projection lens is indicated on the screen, and is determined by the user's confirmation. However, the projection lens itself may be directly inputted by the user using the remote controller 1.

(2) The preceding embodiments describe the case when a zoom lens is used as the projection lens 17 of the projector 100. The same effect can be achieved when a fixed-focus lens is used. In this case, however, a degree of flexibility in the adjustment will decrease as a matter of course since the zoom adjustment cannot be performed.

(3) The present invention can be applied to a projector in which a projection lens is fixed and so cannot be replaced with another kind of projection lens. In this case, the projection condition preset memory 6 stores the correlation data concerning this projection lens only.

(4) In the second embodiment, the pattern images 151 to 159 are respectively formed at the nine points so as to reliably achieve the high-precision adjustments. In accordance with the adjustment data for each pattern image, the position error of the projector is calculated. However, the horizontal and vertical inclinations can be determined using the adjustment data of three points only. Moreover, the amounts of horizontal and vertical position adjustments are determined through the adjustment having been made to one corner of the pattern image. Therefore, the high-precision adjustments can be achieved by forming at least three pattern images at the positions corresponding to the three corners of the screen 30.

(5) The preceding embodiments describe the case where the various entry screens are displayed on the screen 30 in the on-screen display state so that the user can make the adjustments in the interactive manner. Thus, a projector of the present invention allows the setup and adjustments by an inexperienced user. These on-screen displays are not limited on the screen. For example, a liquid crystal display device for displaying these various entry screens may be provided for the projector or remote controller.

Figure 25:
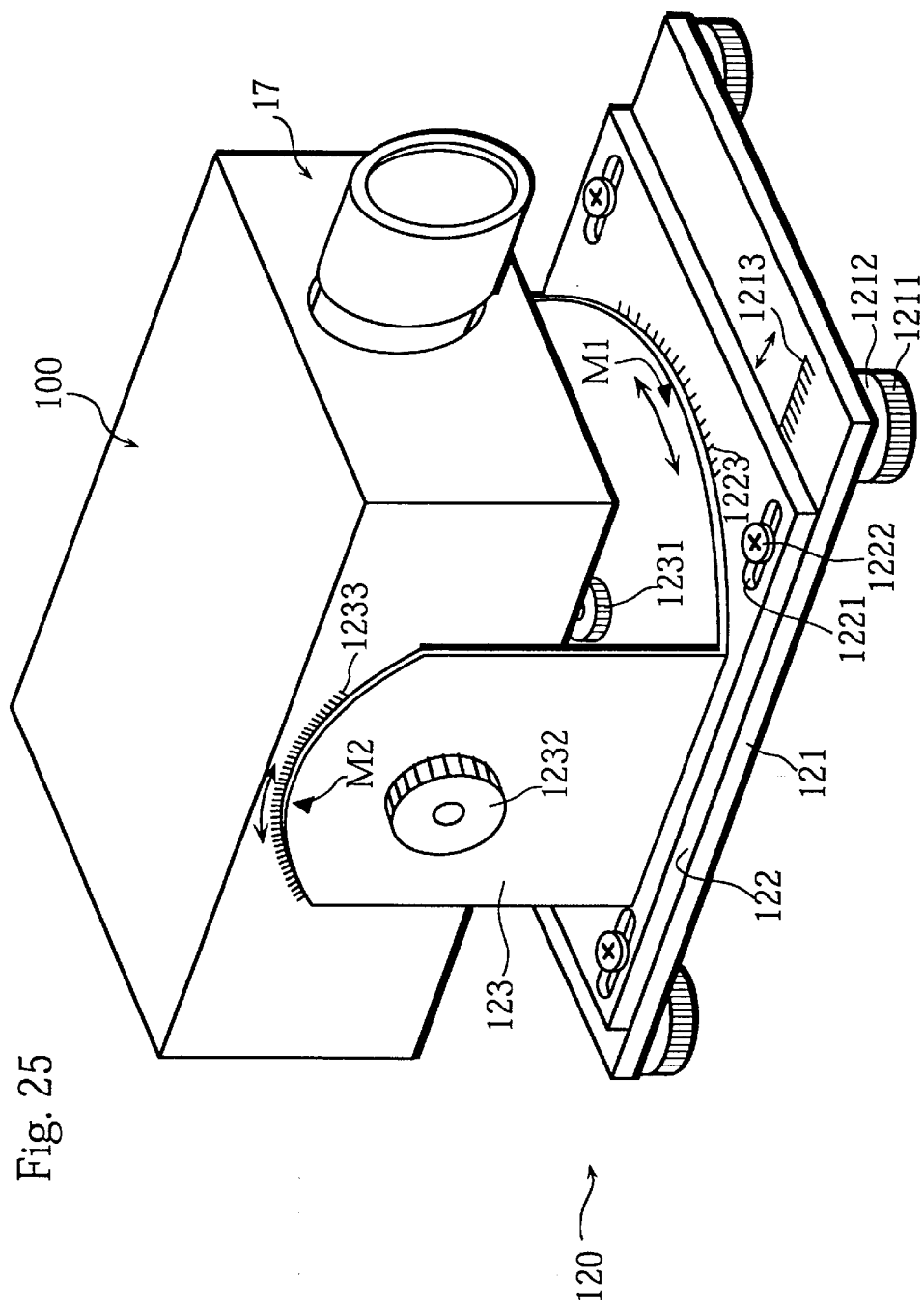
FIG. 25 shows an example of a holding equipment that is used for holding the projector in such a manner that the inclination of the projector can be adjusted in the horizontal and vertical directions.

(6) The projector 100 is repositioned in the high-precision adjustments in accordance with the calculation results shown in the calculation result display screen 51 in the second embodiment (see FIG. 19B). Here, in order to reliably perform this repositioning, a holding equipment 120 as shown in FIG. 25 may be provided for the projector 100. The holding equipment 120 is composed of a first board 121 and a second board 122. The second board 122 is set slidably on the first board 121 in the optical axis direction via round rectangular holes 1221 and bolts 1222. A holding member 123 is mounted on the second board 122, being horizontally rotatable about a bolt 1231. The projector 100 is mounted on the holding member 123, being vertically rotatable about a bolt 1232.

At each of the four corners of the underside of the first board 121, a screw having an adjustment knob 1211 is screwed into a screw base 1212. The height of the holding equipment 120 is changed by turning the adjustment knob 1211.

The vertical inclination of the projector 100 is adjusted by moving an arrow M2 along a scale 1233 that is provided on the side wall of the projector 100. The horizontal inclination of the projector 100 is adjusted by moving an arrow M1 along a scale 1223 that is provided on the second board 122. Movement of the projector 100 in the optical axis direction can be properly adjusted by means of a scale 1213 that is provided on the first board 121.

(7) The preceding embodiments describe the case when a liquid crystal panel is used as the display device 10, although this is not a limitation for the present invention. From the gist of the present invention that simplifies the projection condition adjustments, any kind of display device that allows images to be scaled up using a projection lens may be used. For example, the present invention can be adapted to use a reflective liquid crystal panel or digital micromirror device (DMD). The DMD separately drives a plurality of micromirrors that are arranged in matrix form and displays an image by changing reflecting directions of the micromirrors. Also, the present invention can be applied to setting the projection conditions of conventional film projectors.

INDUSTRIAL APPLICABILITY

The present invention can be favorably used as a projector that is quickly set and adjusted by the user through simple input operations without the inconvenience of manually adjusting the setting position of the projector, and is suitable for use in a space, such as a hall.

What is claimed is:

1. A projector that projects an image displayed on an image display device onto a screen via a projection lens, the projector comprising:

a lens driving means for driving the projection lens;

a receiving means for receiving an input of at least one projection condition;

a parameter determining means for determining a control parameter to control the lens driving means, in accordance with the received projection condition; and a control means for controlling the lens driving means in accordance with the determined control parameter;

wherein the lens driving means includes:

a zoom ratio adjusting mechanism for adjusting a zoom ratio of the projection lens; and a focus adjusting mechanism for adjusting a focus of the projection lens.

2. The projector as in claim 1, wherein the parameter determining means includes a storing means for storing correlation data that shows a plurality of projection conditions and, for each projection condition, a control parameter that satisfies the projection condition, and determines the control parameter in accordance with the correlation data.

3. The projector as in claim 2, wherein the receiving means receives a plurality of the projection conditions that include a projection distance and a projection display size.

4. The projector as in claim 1, wherein the receiving means receives a plurality of the projection conditions that include a projection distance and a projection display size.

5. The projector as in claim 4, wherein the lens driving means includes:

a zoom ratio adjusting mechanism for adjusting a zoom ratio of the projection lens; and a focus adjusting mechanism for adjusting a focus of the projection lens.

6. The projector as in claim 1, wherein the projection conditions include information regarding a distance measured in a vertical direction from a vertical center of the screen to an optical axis of the projection lens, wherein the lens driving means includes a vertical alignment changing means for changing a vertical alignment of the projection lens and the image display device.

7. The projector as in claim 2, wherein the projection conditions include information regarding a distance measured in a vertical direction from a vertical center of the screen to an optical axis of the projection lens, wherein the lens driving means includes a vertical alignment changing means for changing a vertical alignment of the projection lens and the image display device.

8. A projector that projects an image displayed on an image display device onto a screen via an interchangeable projection lens, the projector comprising:

a lens driving means for driving the projection lens;

a receiving means for receiving inputs respectively regarding at least one projection condition and the projection lens attached to the projector;

a parameter determining means for determining a control parameter to control the lens driving means, in accordance with the received inputs regarding the projection condition and the projection lens; and a control means for controlling the lens driving means in accordance with the determined control parameter.

9. The projector as in claim 8, wherein the parameter determining means includes a storing means for storing correlation data for each projection lens, the correlation data showing a plurality of projection conditions and, for each projection condition, a control parameter that satisfies the projection condition, and determines the control parameter in accordance with the correlation data.

10. The projector as in claim 9, wherein the receiving means receives a plurality of the projection conditions that include a projection distance and a projection display size.

11. The projector as in claim 9, wherein the projection conditions include information regarding a distance measured in a vertical direction from a vertical center of the screen to an optical axis of the projection lens, wherein the lens driving means includes a vertical alignment changing means for changing a vertical alignment of the projection lens and the image display device.

12. The projector as in claim 8, further comprising:

an entry screen displaying means for displaying an entry screen on which the user inputs a content that is to be received by the receiving means; and an entry screen control means for having the entry screen show the content that is received by the receiving means from the user.

13. The projector as in claim 8, wherein the receiving means receives a plurality of the projection conditions that include a projection distance and a projection display size.

14. The projector as in claim 8, wherein the projection conditions include information regarding a distance measured in a vertical direction from a vertical center of the screen to an optical axis of the projection lens, wherein the lens driving means includes a vertical alignment changing means for changing a vertical alignment of the projection lens and the image display device.

15. The projector as in claim 8, further comprising:

an entry screen displaying means for displaying an entry screen on which the user inputs a content that is to be received by the receiving means; and an entry screen control means for having the entry screen show the content that is received by the receiving means from the user.

16. A projector that projects an image displayed on an image display device onto a screen via an interchangeable projection lens, the projector comprising:

a receiving means for receiving an input of at least one projection condition;

a storing means for storing information regarding a characteristic for each of a plurality of interchangeable projection lenses;

a selecting means, in accordance with the information stored in the storing means, for selecting a projection lens from the plurality of projections lenses as an optimum projection lens, the characteristic of the selected projection lens most satisfying the received projection condition; and a displaying means for indicating the projection lens selected as the optimum projection lens.

17. The projector as in claim 16, wherein the receiving means receives a plurality of projection conditions that include a projection distance and a projection display size, wherein the information stored in the storing means for each projection lens relates to a projection distance that is required to attain a projection display size using the projection lens, and wherein the selecting means finds the projection distance required to attain the received projection display size for each projection lens, and selects a projection lens as an optimum projection lens, the projection distance of the selected projection lens being a closest to the projection distance received as the projection condition by the receiving means.

18. The projector as in claim 17,
wherein the displaying means further indicates the projection distance required to attain the received projection display size using the projection lens selected as the optimum projection lens.

19. The projector as in claim 16,
wherein the displaying means further indicates the projection distance required to attain the received projection display size using the projection lens selected as the optimum projection lens.

20. The projector as in claim 16, further comprising:
an entry screen displaying means for displaying an entry screen on which the user inputs a content that is to be received by the receiving means; and
an entry screen control means for having the entry screen show the content that is received by the receiving means from the user.

21. A projector that projects an image displayed on an image display device onto a screen via a projection lens, the projector comprising:
a lens driving means for driving the projection lens;
a receiving means for receiving an input from a user;
a control means for controlling the lens driving means in accordance with the input received from the user;
a pattern generating means for displaying a predetermined pattern formed from a plurality of pattern images on the image display device so that the plurality of pattern images are respectively displayed at a plurality of positions on a display area of the image display device;
a calculating means for calculating errors in setting conditions of the projector in accordance with amounts of control to be performed by the control means for each pattern image through an input operation which the user performed to adjust a projection state of the pattern image projected on the screen; and
a displaying means for indicating the errors calculated by the calculating means.

22. The projector as in claim 21,
wherein the setting conditions include horizontal and vertical inclinations of the projector.

23. The projector as in claim 22,
wherein the plurality of positions at which the pattern images are respectively displayed include at least three positions that positionally correspond to three out of four corners of the screen.

24. The projector as in claim 21,
wherein the plurality of positions at which the pattern images are respectively displayed include at least three positions that positionally correspond to three out of four corners of the screen.

25. The projector as in claim 21, further comprising:
an entry screen displaying means for displaying an entry screen on which the user inputs a content that is to be received by the receiving means; and
an entry screen control means for having the entry screen show the content that is received by the receiving means from the user.

* * * * *